US012102969B2

(12) United States Patent
Newton et al.

(10) Patent No.: US 12,102,969 B2
(45) Date of Patent: Oct. 1, 2024

(54) VALVE DEVICE

(71) Applicants: John Newton, Sebastian, FL (US); Peter Brooke, Micco, FL (US); Jacob Lockwood, Vero Beach, FL (US); Dustin Hartsfield, Sebastian, FL (US); Michael Cheney, Vero Beach, FL (US); Gillian Callaghan, Vero Beach, FL (US); Rory Pawl, West Bloomfield, MI (US)

(72) Inventors: John Newton, Sebastian, FL (US); Peter Brooke, Micco, FL (US); Jacob Lockwood, Vero Beach, FL (US); Dustin Hartsfield, Sebastian, FL (US); Michael Cheney, Vero Beach, FL (US); Gillian Callaghan, Vero Beach, FL (US); Rory Pawl, West Bloomfield, MI (US)

(73) Assignee: GAT8 CFV Solutions, INC., Sebastian, FL (US)

( * ) Notice: Subject to any disclaimer, the term of this patent is extended or adjusted under 35 U.S.C. 154(b) by 219 days.

(21) Appl. No.: 17/591,275

(22) Filed: Feb. 2, 2022

(65) Prior Publication Data

US 2022/0241738 A1 Aug. 4, 2022

Related U.S. Application Data

(60) Provisional application No. 63/145,047, filed on Feb. 3, 2021.

(51) Int. Cl.

*B01F 23/45* (2022.01)
*B01F 101/14* (2022.01)

(52) U.S. Cl.

CPC .......... *B01F 23/45* (2022.01); *B01F 2101/14* (2022.01)

(58) Field of Classification Search

CPC ........................................ B01F 23/45
See application file for complete search history.

(56) References Cited

U.S. PATENT DOCUMENTS

| | | | | |
|---|---|---|---|---|
| 4,226,344 A * | 10/1980 | Booth | B67D 1/0085 | 91/453 |
| 4,230,147 A * | 10/1980 | Booth | G05D 7/0133 | 137/504 |
| 4,250,919 A * | 2/1981 | Booth | G05D 7/0133 | 137/607 |
| 6,263,905 B1 * | 7/2001 | Yokota | G05D 16/028 | 137/413 |
| 2008/0011365 A1 * | 1/2008 | Newton | F16K 41/12 | 137/540 |
| 2008/0029174 A1 * | 2/2008 | Yoshino | F16K 41/12 | 137/828 |
| 2009/0026768 A1 * | 1/2009 | Shimizu | F03B 13/00 | 415/185 |
| 2009/0146431 A1 * | 6/2009 | Onodera | H02K 21/12 | 310/156.01 |
| 2009/0260691 A1 * | 10/2009 | Herman | B41J 2/175 | 347/85 |

(Continued)

*Primary Examiner* — Kevin R Barss
(74) *Attorney, Agent, or Firm* — CF3; Stephen Eisenmann

(57) ABSTRACT

Examples disclosed herein relate to an assembly including a CF Valve coupled to a solenoid and an inlet area on a first plane, an outlet area located on a second plane, and a flow path which passes through the CF Valve and the solenoid to the outlet area on at least a portion of the first plane.

20 Claims, 15 Drawing Sheets

(56) References Cited

U.S. PATENT DOCUMENTS

| | | | | |
|---|---|---|---|---|
| 2013/0032742 | A1 * | 2/2013 | Scherer | H01F 7/13 29/602.1 |
| 2015/0034187 | A1 * | 2/2015 | Crawford | F16K 31/10 137/556 |

* cited by examiner

VALVE DEVICE

REFERENCE

The present application claims priority to Provisional Patent Application No. 63/145,047 filed Feb. 3, 2021 which is incorporated in its entirety by reference.

FIELD

The subject matter disclosed herein relates to utilizing CF Valve functionality in a CF Valve assembly which can include a CF Valve, a solenoid, a connecting device, and/or a plunger. More specifically, to a CF Valve functionality that allows for enhanced fluid control.

INFORMATION

The dispensing industry has numerous ways to dispense one or more fluids and/or gases. This disclosure highlights enhanced devices, methods, and systems for dispensing these one or more fluids and/or gases.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION OF THE DISCLOSURE

Figure 1:
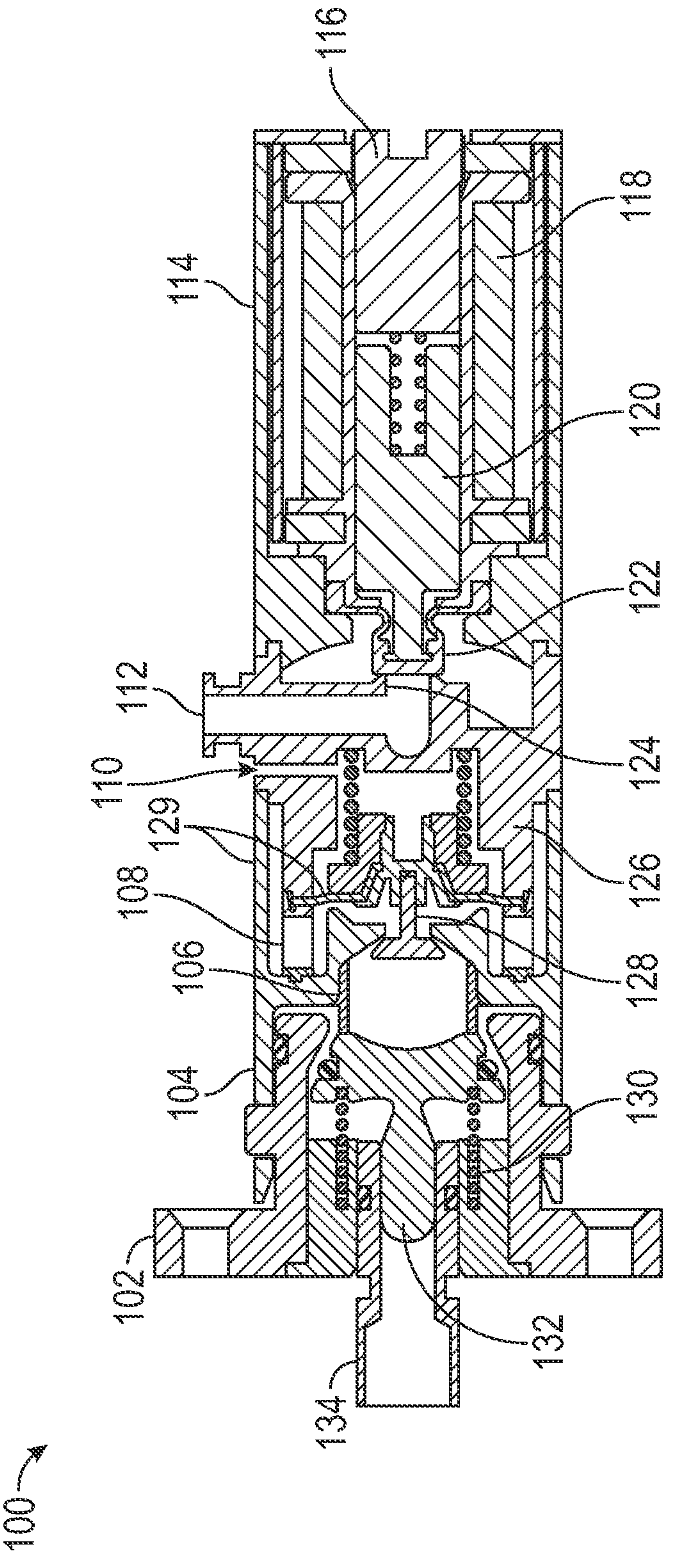
FIG. 1 is an illustration of a CF Valve with a plunger and a solenoid, according to one embodiment.

In FIG. 1, an illustration of a CF Valve with a plunger and a solenoid is shown, according to one embodiment. A CF Valve assembly 100 may include a backing block with a twist lock and seal 102, a first portion of a CF Valve body 104, a plunger opening device 106, a CF Valve outlet ring 108, a spring cavity vent 110, a plunger body with outlet options 112, a solenoid plunger stroke adjustment 116, a solenoid coil 118, a solenoid plunger with closing spring 120, a solenoid isolation diaphragm 122, a solenoid diaphragm seal surface 124, a second portion of a CF Valve body 126, a throttle pin 128, a CF Valve diaphragm 129, a plunger close spring 130, a plunger 132, and/or an inlet 134.

The CF Valve assembly 100 is compact and can be utilized in modular format (e.g., side by side in small spaces). In addition, the CF Valve assembly 100 can be utilized with a click lock/turn lock dry break for ease of installation in tight spaces. Further, the operating pressure can be customized for the application (e.g., 14 PSI, 21 PSI, 30 PSI, 40 PSI, 60 PSI (and/or anything in between and/or anything higher and/or lower)). In addition, the valve can be scaled up or down to fit any flow rate(s) needed.

In various examples, the solenoid 202 may be adjustable. For example, the pull piece height may be adjusted to increase and/or decrease the relative diameter and/or orifice outlet size (See reference number 116). In other examples, the adjustment to the solenoid plunger stroke 116 may be completed mechanical by lowering or raising the plunger and/or by controlling the power or electricity by increasing and/or decreasing the power to the solenoid which causes the lift to increase and/or decrease (See FIGS. 12A-12C).

In another example, the outlet metering orifice may be adjustable. Further, the operating pressure may be adjustable. This may be accomplished via the CF Valve. In addition, the volcano outlet area's (reference numbers 124 and 212) shape (e.g., cone, funnel, bullet, square, cylinder, etc.) may be modified to provide further fine tuning of the flow rate. Each shape has its own volume which modifies the flow rate.

In one example, the CF Valve assembly 100 may be adjusted by utilizing a fixed orifice. In another example, the CF Valve assembly 100 may be adjusted by utilizing a needle valve. In another example, the CF Valve assembly 100 may be adjusted by utilizing a pulsing on-off functionality via the solenoid (see FIGS. 12A-12C). In another example, the pulsing pattern and/or electrical recipes may be loaded into a controller to make multiple drinks for a bank of valves.

In one example, the CF Valve with the isolation solenoid has a flow path that is straight into the CF Valve and straight into the solenoid where the outlet area can be at any angle but the CF Valve and the solenoid are at a relative angle of zero with respect to each other.

Figure 2A:
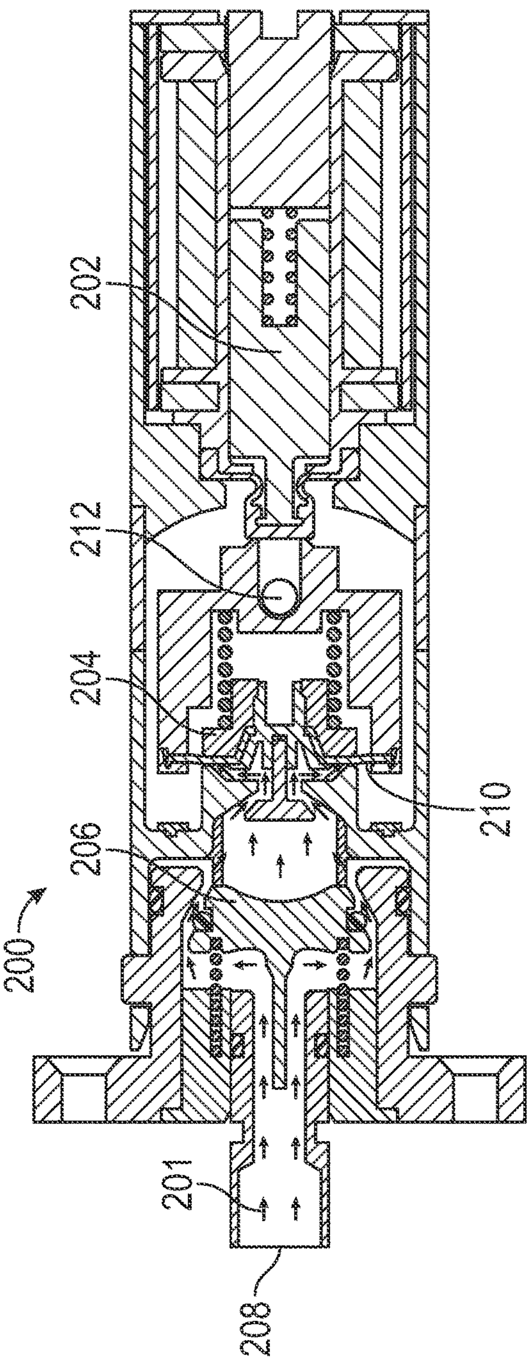
FIG. 2A is an illustration of a CF Valve assembly in a closed position and a closed solenoid, according to one embodiment.

In FIG. 2A, an illustration of a CF Valve assembly in a closed position and a closed solenoid is shown, according to one embodiment. A CF Valve assembly 200 may include a solenoid 202, a CF Valve 204, a plunger 206, an inlet area 208, a fluid flow 201, a CF Valve diaphragm 210, and/or an outlet 212. In this example, the fluid flow 201 is stopped at the CF Valve 204 by the CF Valve diaphragm 210.

Figure 2B:
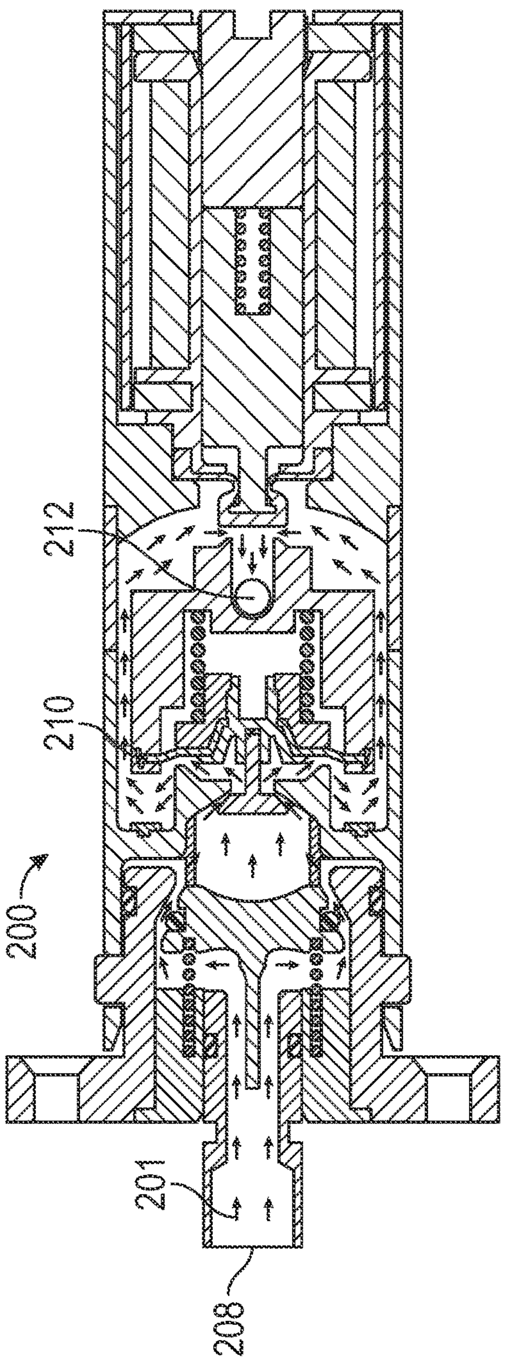
FIG. 2B is an illustration of a CF Valve assembly in a regulating position and an opened solenoid, according to one embodiment.

In FIG. 2B, an illustration of a CF Valve assembly in a regulating position and an opened solenoid is shown, according to one embodiment. In this example, a CF Valve assembly 200 may have the fluid flow 201 pass by the CF Valve 204 because CF Valve diaphragm 210 is open. Further, the fluid flow 201 travels to the outlet 212 and leaves the outlet 212 with specific fluid flow characteristics (e.g., PSI, flow rate, timing, etc.). It should be noted that the fluid flow path goes straight into the CF Valve and the solenoid. This configuration is unique and allows for a compact structure to be utilized.

Figure 3:
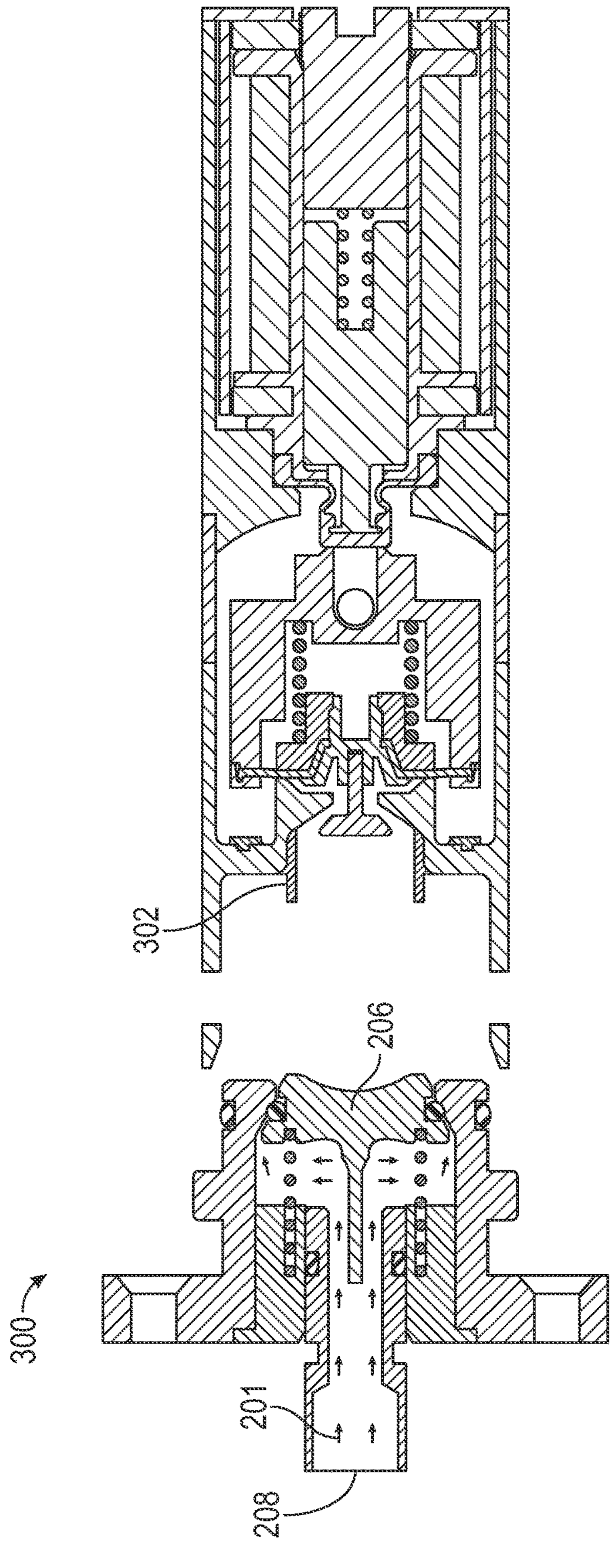
FIG. 3 is an illustration of a CF Valve assembly with a twist release locking system, according to one embodiment.

In FIG. 3, an illustration of a CF Valve assembly with a twist release system is shown, according to one embodiment. In one example, a CF Valve assembly 300 is separated into two parts. A first part is the plunger 206 with the inlet 208 and the fluid flow 201 and a second part is the CF Valve and the solenoid. In this example, the plunger 206 (e.g., first part) may be connected to the CF Valve and the solenoid (e.g., second part) by twisting and locking the plunger 206 onto the second part (See FIG. 4B). In this example, the plunger 206 is opened via a plunger opening device 302 which pushes the plunger 206 open (See FIGS. 2A-2B).

In one example, the turn and lock feature can be any design and can also be a dry break. In addition, it can be female to male or male to female interconnections. In one example, the connecting device may be locked and/or unlocked by pushing a first time on the connecting device to lock it into place and then pushing a second time on the connecting device to unlock the device. In another example, a clip feature is utilized which can be located on the front and/or on the rear of the connecting device. In one example, the CF Valve area is the male portion and the plunger area is the female portion. In another example, the CF Valve area is the female portion and the plunger area is the male portion. In various other examples, the female portion on the CF Valve area may utilize tabs on either the internal component area or the external component area to engage with the plunger area. In one example, the valve system allows fluid to flow only when the valve is placed in the dry break.

Figure 4A:
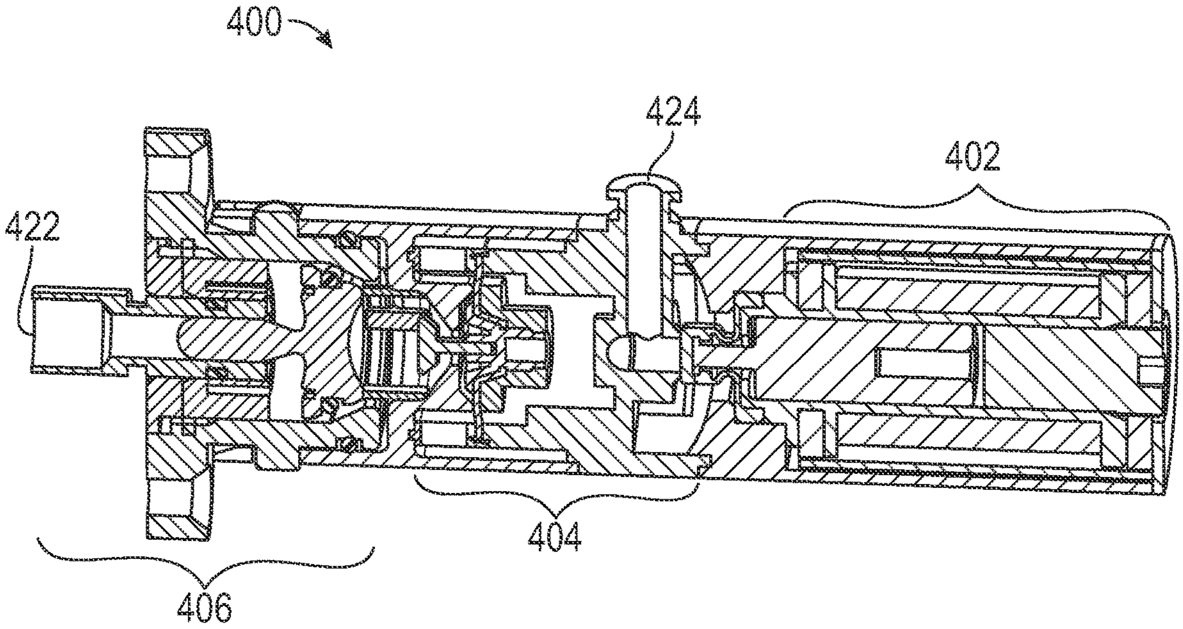
FIG. 4A is an illustration of a CF Valve assembly, according to one embodiment.

In FIG. 4A, an illustration of a CF Valve assembly is shown, according to one embodiment. In this example, a CF Valve assembly 400 includes a solenoid area 402, a CF Valve area 404, and/or a plunger area 406. The CF Valve assembly 400 may include one or more inlet areas 422 and one or more outlet areas 424. In this example, only one inlet area and outlet area are shown.

Figure 4B:
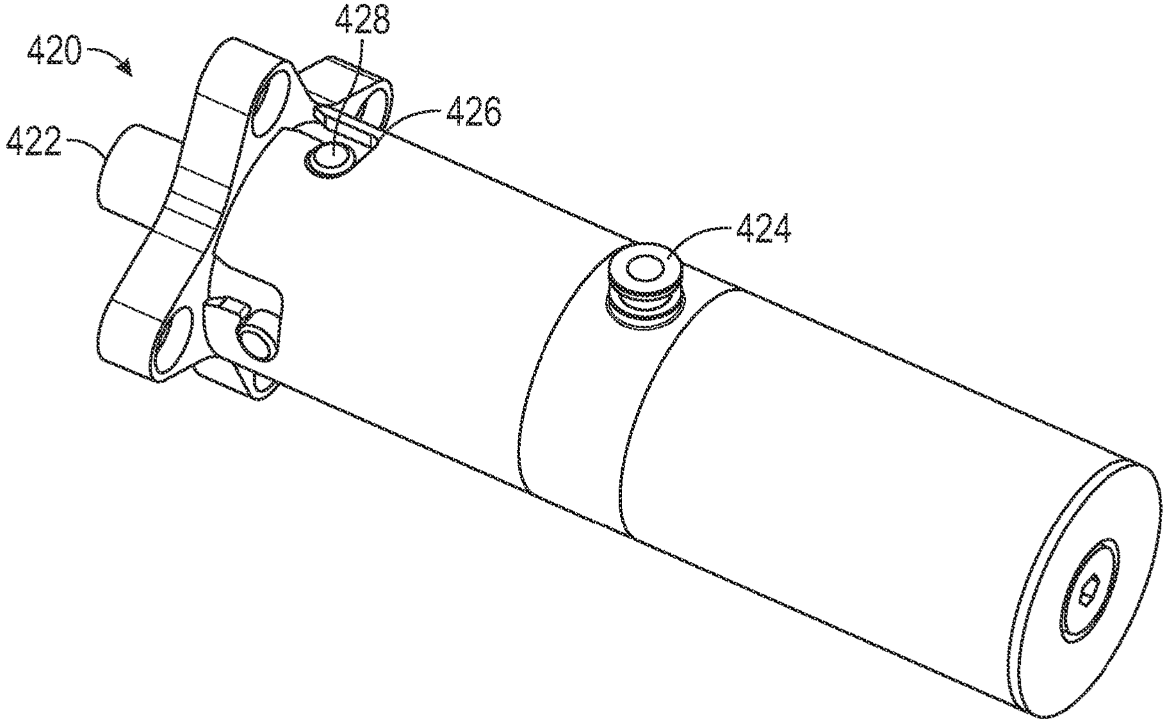
FIG. 4B is another illustration of a CF Valve assembly, according to one embodiment.

In FIG. 4B, another illustration of a CF Valve assembly is shown, according to one embodiment. In this example, a CF Valve assembly 420 is shown where the plunger area 406 is attached to the CF Valve area 404 via a twist and lock device. The twist and lock device includes a locking area 426 and locking pin 428. In addition, CF Valve assembly 420 includes an inlet area 422 and an outlet area 424. The inlet area 422 has a straight in configuration in relation to the plunger area 406, the CF Valve area 404, and/or the solenoid area 402. Whereas, the outlet area 424 is at a 90 degree angle to the inlet area 422, the plunger area 406, the CF Valve area 404, and/or the solenoid area 402. The outlet area 424 may be at any angle (e.g., 0 degrees . . . , 20 degrees . . . , 45 degrees . . . , 90 degrees . . . , . . . 180 degrees, and/or . . . 360 degrees). For brevity, all of the various degrees from 0.1 to 359.9 are not written out. However, all of these degrees are part of the present disclosure.

In various examples, values for the pressure, the flow rate, and the outlet area angle can be modified. For example, a pressure of 1 PSI . . . , 2 PSI . . . , 3 PSI . . . , 4 PSI . . . , 5 PSI . . . , 6 PSI . . . , 7 PSI . . . , 8 PSI . . . , 9 PSI . . . , 10 PSI . . . , 11 PSI . . . , 12 PSI . . . , 13 PSI . . . , 14 PSI . . . , 15 PSI . . . , 16 PSI . . . , 17 PSI . . . , 18 PSI . . . , 19 PSI . . . , 20 PSI . . . , 21 PSI . . . , 22 PSI . . . , 23 PSI . . . , 24 PSI . . . , 25 PSI . . . , 26 PSI . . . , 27 PSI . . . , 28 PSI . . . , 29 PSI . . . , 30 PSI . . . , 31 PSI . . . , 32 PSI . . . , 33 PSI . . . , 34 PSI . . . , 35 PSI . . . , 36 PSI . . . , 37 PSI . . . , 38 PSI . . . , 39 PSI . . . , 40 PSI . . . , 41 PSI . . . , 42 PSI . . . , 43 PSI . . . , 44 PSI . . . , 45 PSI . . . , 46 PSI . . . , 47 PSI . . . , 48 PSI . . . , 49 PSI . . . , 50 PSI . . . , 51 PSI . . . , 52 PSI . . . , 53 PSI . . . , 54 PSI . . . , 55 PSI . . . , 56 PSI . . . , 57 PSI . . . , 58 PSI . . . , 59 PSI . . . , 60 PSI . . . , 61 PSI . . . , 62 PSI . . . , 63 PSI . . . , 64 PSI . . . , 65 PSI . . . , 66 PSI . . . , 67 PSI . . . , 68 PSI . . . , 69 PSI . . . , 70 PSI . . . , 71 PSI . . . , 72 PSI . . . , 73 PSI . . . , 74 PSI . . . , 75 PSI . . . , 76 PSI . . . , 77 PSI . . . , 78 PSI . . . , 79 PSI . . . , 80 PSI . . . , and/or etc. can be combined with a flow rate (e.g., 0.001 gpm (gallons per minute) to 8 gpm and/or any other number) which can further be combined with any outlet angle (e.g., 0 degrees, 20 degrees, 45 degrees, 90 degrees, 180 degrees, etc.). For brevity, all of the various degrees from 0.1 to 359.9 are not written out. However, all of these degrees are part of the present disclosure.

Figure 12A:
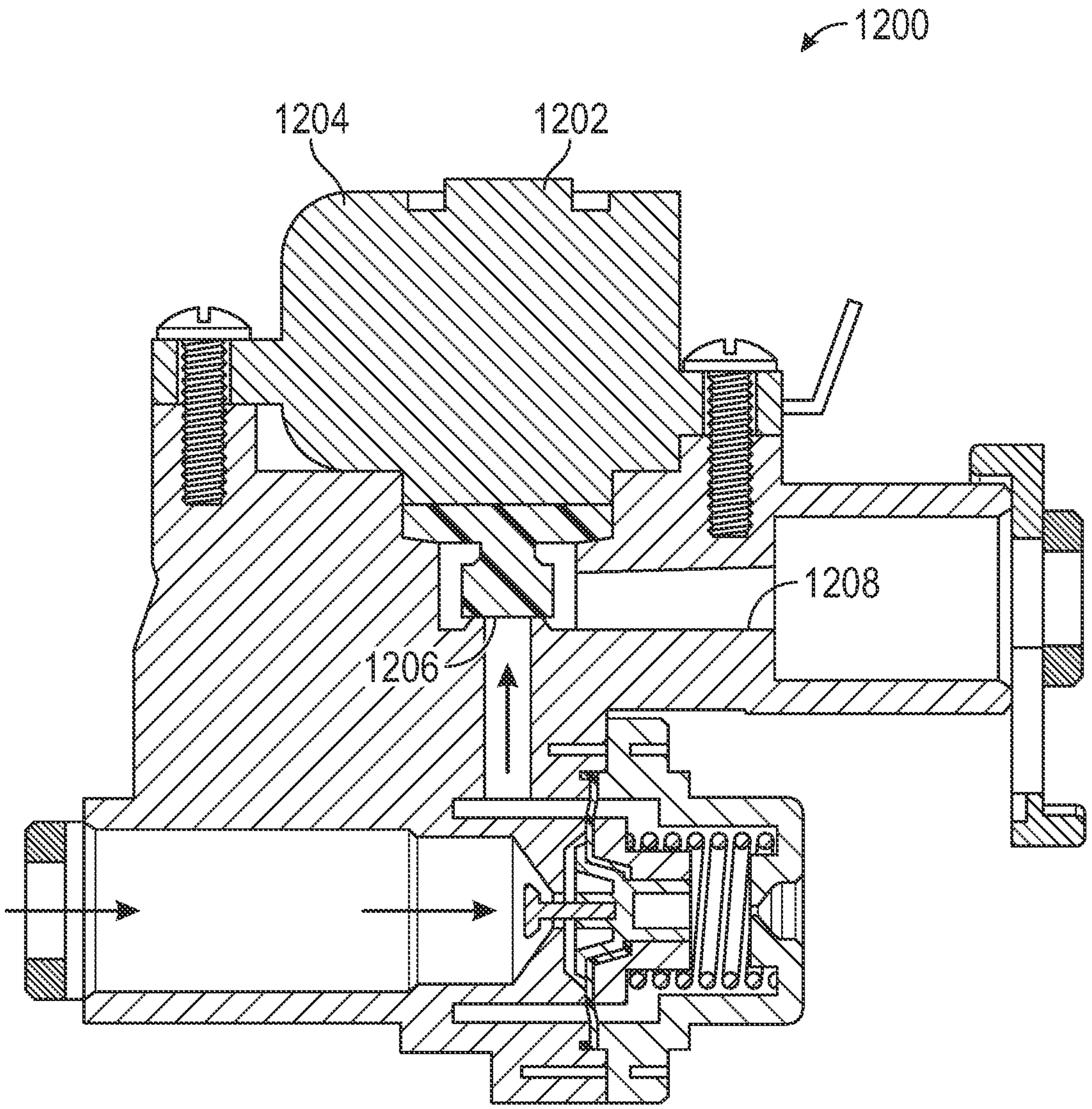
FIGS. 12A-12C are illustration of a pulsing the solenoid system, according to various embodiments.
Figure 12B:
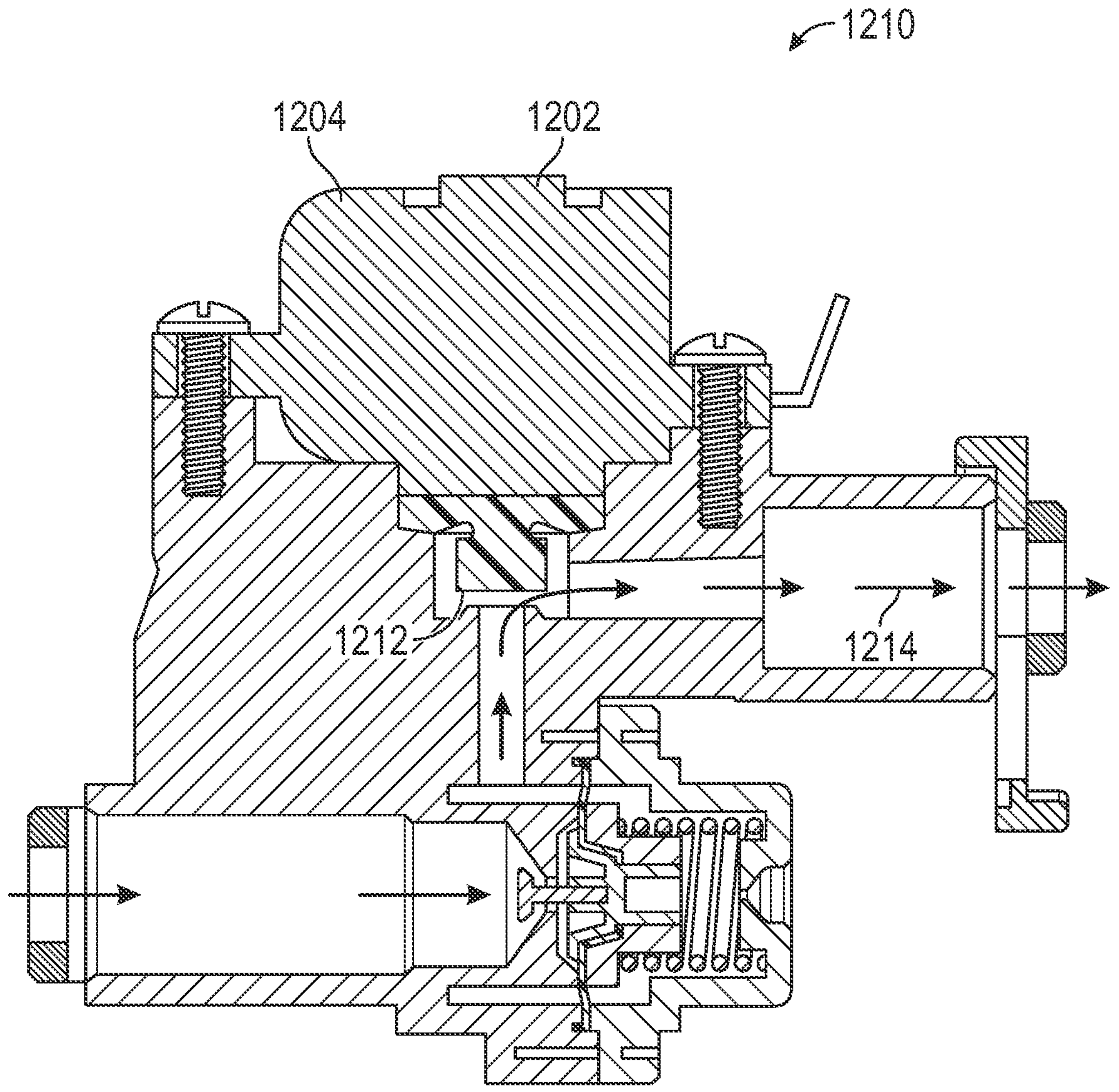
Figure 12C:
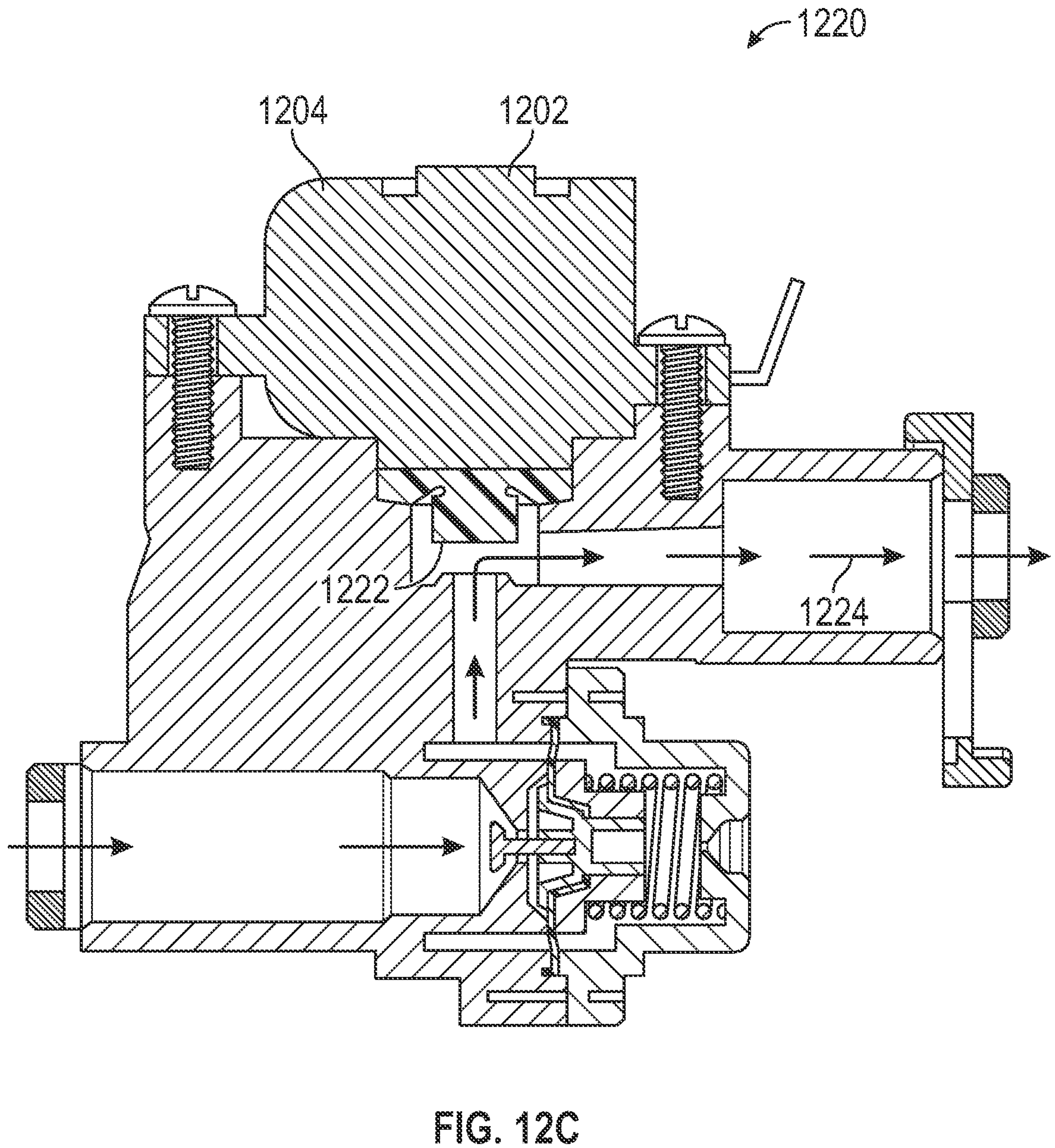

For example, a pressure of 15.1 PSI can be utilized with a flow rate of 0.01 gpm and have an outlet area angle of 2 degrees. In another example, a pressure of 18 PSI can be utilized with a flow rate of 0.1 gpm and have an outlet area angle of 90 degrees. Further, a pressure of 20 PSI can be utilized with a flow rate of 0.5 gpm and have an outlet area angle of 45 degrees. In addition, the flow rate may be achieved by pulsing the stream as shown in FIGS. 12A-12C.

Figure 5:
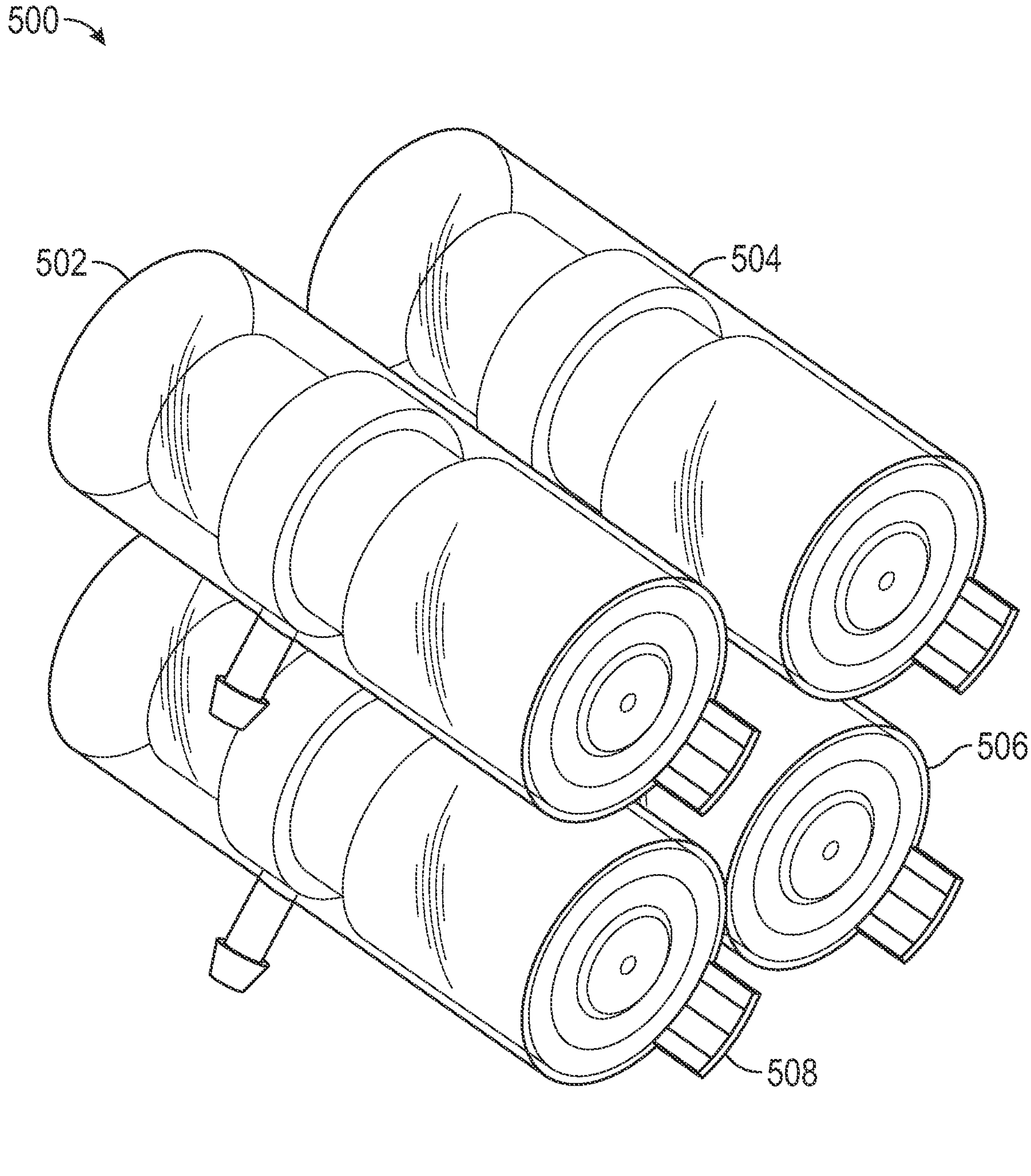
FIG. 5 is an illustration of multiple CF Valve assemblies, according to one embodiment.

In FIG. 5, an illustration of multiple CF Valve assemblies is shown, according to one embodiment. In this example, a multiple CF Valve assembly 500 may include a first CF Valve assembly 502, a second CF Valve assembly 504, a third CF Valve assembly 506, and/or an Nth CF Valve assembly 508. In one example, a three flavor dispensing unit can be created by having the first CF Valve assembly 502 be a first flavor, the second CF Valve assembly 504 be a second flavor, the third CF Valve assembly 506 be a third flavor, and the Nth CF Valve assembly 508 be a water unit (e.g., and/or carbonated water unit).

In another example, a two syrup and one flavor shot dispensing unit can be created by having the first CF Valve assembly 502 be a first syrup, the second CF Valve assembly 504 be a second syrup, the third CF Valve assembly 506 be a first flavor shot, and the Nth CF Valve assembly 508 be a water unit (e.g., and/or carbonated water unit).

In another example, the dispensing unit may have two waters (e.g., carbonated and still) and one or more syrups. In this example, sparkling water can be generated by utilizing ½ still and ½ carbonated with the one or more syrups.

In another example, the solenoid may be pulsed to generate a flow rate. Further, the solenoid may be pulsed based on a duty cycle. In addition, the solenoid may modify a flow rate based on an electrical power level delivered to the solenoid.

In one embodiment, a valve assembly may include: a CF Valve; a solenoid coupled to the CF Valve; an inlet area coupled to the CF Valve; an outlet area; and/or a flow path that has a path through the CF Valve and the solenoid to the outlet area where the CF Valve and the solenoid are located on a plane.

In another example, the valve assembly may include a plunger coupled to the inlet area and in communication with the CF Valve. In addition, the valve assembly may include a plunger opening device located between the CF Valve and the plunger. Further, the valve assembly may include a backing block. In addition, the valve assembly may include a CF Valve outlet ring. Further, the valve assembly may include a spring cavity vent. In addition, the solenoid may include a solenoid adjustment device. Further, the solenoid adjustment device may change a height of the solenoid. In addition, the CF Valve may include a housing having axially aligned inlet and outlet ports adapted to be connected respectively to the variable fluid supply and the fluid outlet; a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; a resilient disc-shaped diaphragm closing the open mouth of the cup, the diaphragm being axially supported by the circular rim and having a peripheral flange overlapping the cylindrical side wall; a piston assembly secured to the center of the diaphragm, the piston assembly having a cap on one side of the diaphragm facing the inner side of the barrier wall, and a base suspended from the opposite side of the diaphragm and projecting into the interior of the cup; a stem projecting from the cap through the first passageway in the barrier wall to terminate in a valve head, the valve head and the outer side of the barrier wall being configured to define a control orifice connecting the inlet port to the diaphragm chamber via the first passageway; and a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet. Further, the CF Valve may maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice. In addition, the CF Valve may maintain a relative constant flow of fluid from a variable pressure fluid supply to a fluid outlet, the CF Valve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

In another embodiment, an assembly may include: a CF Valve coupled to a solenoid and an inlet area on a first plane; an outlet area located on a second plane; and/or a flow path which passes through the CF Valve and the solenoid to the outlet area on at least a portion of the first plane.

In addition, the inlet area may further include a plunger in communication with the CF Valve. Further, the assembly may include a plunger opening device located between the CF Valve and the plunger. In addition, the assembly may include a backing block. In addition, the assembly may include a CF Valve outlet ring. Further, the assembly may include a spring cavity vent. In addition, the solenoid further comprises a solenoid adjustment device. Further, the solenoid adjustment device may change a height of the solenoid. In addition, the changing of the height of the solenoid may change a flow rate.

Figure 6A:
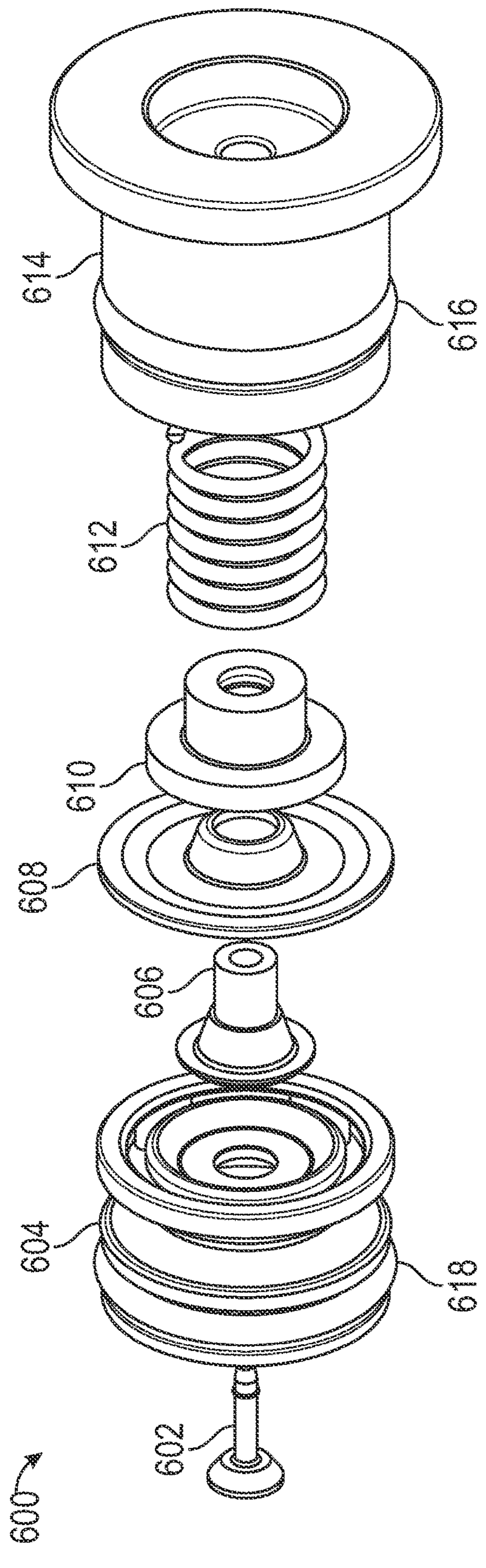
FIG. 6A is an illustration of a CF Cartridge, according to one embodiment.

In FIG. 6A, an illustration of a CF Cartridge 600 is shown, according to one embodiment. The cartridge CF Valve 600 includes a throttle pin 602, a body 604, a body O-Ring 618, a top retainer 606, a diaphragm 608, a bottom retainer 610, a spring 612, a spring cap 614, and a spring cap O-Ring 616. The throttle pin 602 may be stainless steel or other material with a barbed shank and mushroom shape head. The throttle pin throttles flow of fluid through the inlet orifice. The body 604 (or the CF Valve body and/or the cartridge CF Valve body) may be molded plastic forming the inlet passage. The diaphragm 608 (and/or the diaphragm chamber) is a 360 degree outlet passage and diaphragm sealing surface. The body O-Ring 618 is a rubber that seals the fluid functioning part of the cartridge from the housing. The top retainer 606 is a plastic which forms the top half of the diaphragm assembly where the diaphragm 608 is sandwiched between the two retainers (e.g., top retainer 606 and the bottom retainer 610) to form a seal. There is a molded cavity in the upper retainer (e.g., top retainer 606) that positions the barbed shank of the throttle pin 602. The cavity may be machined and/or any other process of manufacturing a cavity.

The diaphragm 608 is a flexible rubber (and/or any other flexible material) shaped to form a seal between the fluid section and the dry section of the spring cavity. The flex of the diaphragm 608 allows the throttle pin 602 to move in response to the spring pressure and inlet pressure thus modulating the fluid flow through the inlet orifice. The bottom retainer 610 is a plastic part which may be welded (and/or press fitted, and/or any other attachment procedure (e.g., glued, stamped, etc.) to the upper retainer (e.g., top retainer 606) to form the diaphragm assembly. The bottom retainer 610 also positions the spring 612 in the spring cap 614. The spring 612 is stainless steel (and/or other similar material—non corrosive material—the material can be a corrosive material also since the area is dry) and serves to keep the diaphragm 608 seated against the sealing ring of the body 604 until there is sufficient input pressure to compress the spring opening the valve for normal operation. As the throttle pin 602 is fastened (could sit on top of—further the spring may not be fastened buy sits against cap and retainer) to the diaphragm assembly, when the inlet pressure depresses the diaphragm 608 and/or the spring 612 and the throttle pin 602 closes the inlet orifice reducing the flow/pressure. There is continuous movement of the spring 612, the diaphragm assembly and the throttle pin 602 as the valve modulates and maintains the preset fixed operating pressure.

The spring cap 614 is usually plastic but can be any material stiff enough to mitigate any movement of the material that would change the length of the spring cap cavity. The length of the cavity is critical because the spring 612 must be preset and/or compressed to the operating load before the cartridge CF Valve 600 is put into operating. It should be noted that the spring cap 614 creates the seal by compressing the diaphragm 608 to the body 604. The rubber cap "O" ring is to form a seal so the passage of the fluid from the body 604 through the housing cannot leak out around the spring cap 614.

Figure 6B:
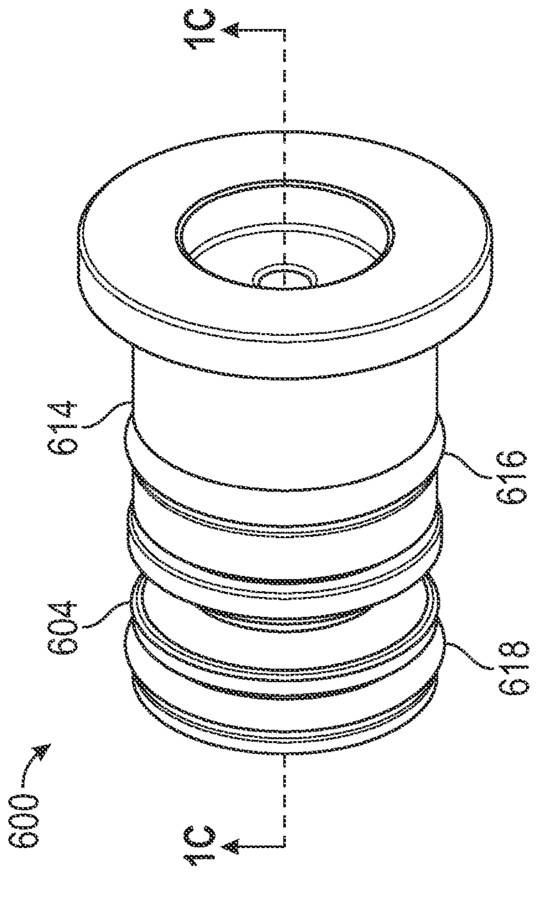
FIG. 6B is another illustration of a CF Cartridge, according to one embodiment.

In FIG. 6B, another illustration of the cartridge CF Valve 600 is shown, according to one embodiment. In this example, the cartridge CF Valve 600 is shown assembled.

It should be noted that the cartridge CF Valve 600 shown in FIGS. 6A-6B are 90 degree versions of the CF Valve configuration. In the 90 degree version, the CF Valve is configured to maintain a relative constant flow of fluid from a variable pressure fluid supply to a fluid outlet, the CF Valve may include: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice. It should be noted that any characteristics and/or features shown and/or described in relation to the 90 degree version can be utilized with the cartridge CF Valve 600.

In another example, a straight through version of the CF Valve can be utilized with any feature and/or function shown and/or described in relation to the the cartridge CF Valve 600. In this example, the CF Valve is configured to maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice. It should be noted that any characteristics and/or features shown and/or described in relation to the straight through version can be utilized with the cartridge CF Valve 600. In this example, an outlet port 624 is at a 90 degree angle to the inlet port.

Figure 7:
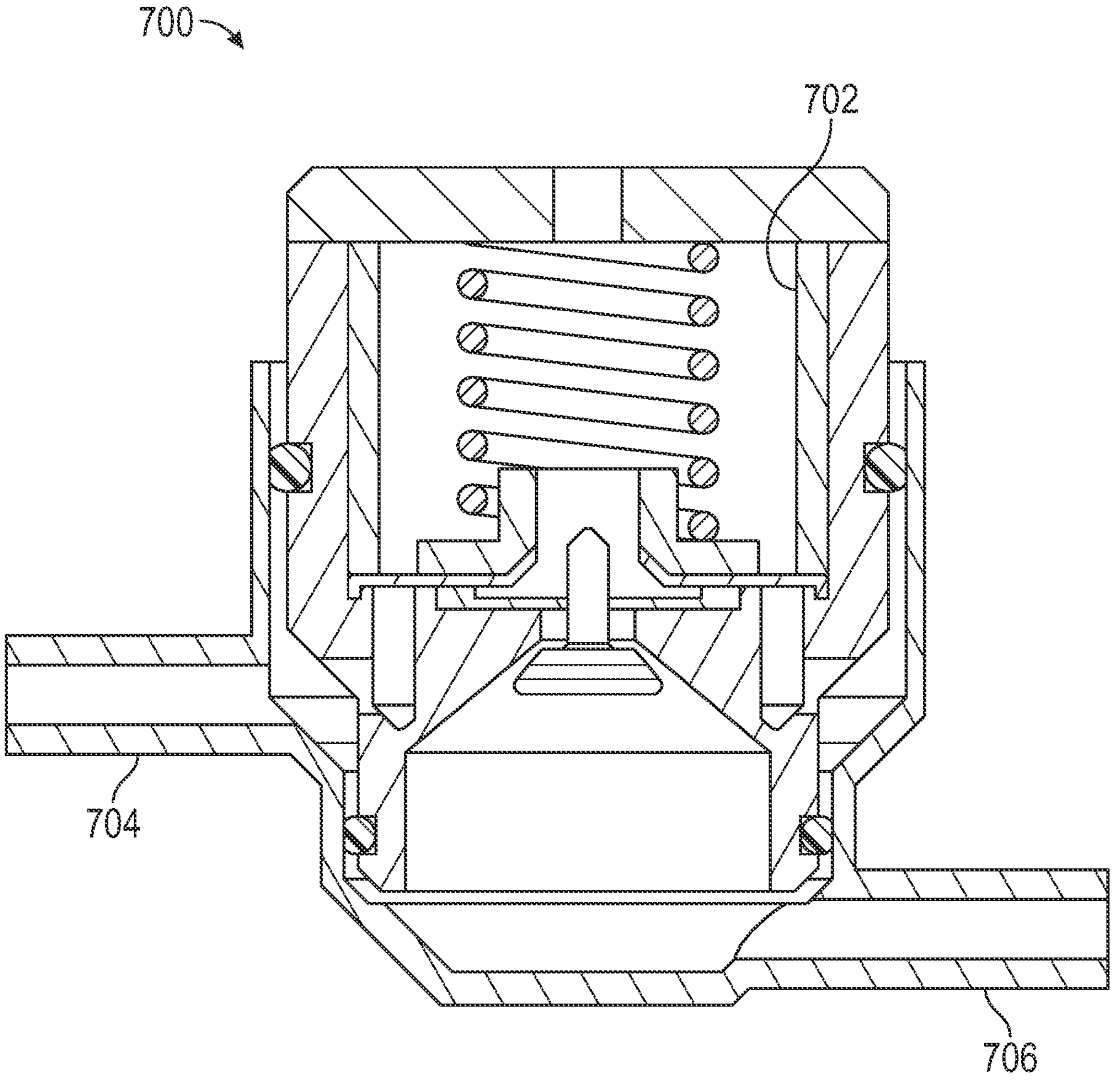
FIG. 7 is an illustration of a CF Cartridge, according to one embodiment.

Further as shown in FIG. 7, the cartridge CF Valve 702 may have an inlet port 706 and an outlet port 704 which are parallel with each other but offset from each other.

In another example shown in FIGS. 6A-6B, a new flow control manifold with the Cartridge CF Valve can be assembled as a single welded part each with a fixed or replaceable orifice and/or a Brix screw. This welded Cartridge CFV Valve can be integrated into an existing design or provide an entirely new flow control manifold to be secured inside existing equipment or on or under the counter for certain applications. In this example, the Cartridge CF Valve is retrofit compatible with existing flow connector (same inlets and outlets). It is simple to remove the existing flow control manifold and replace with a new flow control manifold. In this example, the existing clips/fasteners and shut off components may be reused. Design considerations are fixed or adjustable orifices and the Cartridge CF Valve can be mechanically fastened or welded. In addition, a single SKU for the entire manifold can be used and/or for each valve assembly.

The Cartridge CF Valve is designed to provide a constant rate of fluid flow at a preset pressure when coupled with a down-stream orifice. The CF Valve can be a 90 degree valve, a straight through valve, any combination thereof, and/or any other degree configuration. The Cartridge CF Valve may have a factory set operating pressure from 7.5 psi to 70 psi. In addition, a wide range of flow rates can be used (e.g., 0.01 gpm (gallons per minute) to 8 gpm and/or any other number). There are no wetted mechanicals in the CF Valve, according to one embodiment. There are no ceramics in the CF Valve, according to one embodiment. The CF Valve is self-cleaning, according to one embodiment. In one example, the inlet orifice is smaller than any internal passage. Therefore, no internal clogging occurs. There is minimal wear because the internal components only see operating pressure. In addition, there is no wear at static because there is no movement.

The CFiVe new backing block has a male part which attaches to the female part. In this example, the CFiVe backing block will turn on or turn off the liquid supply with the same knob movement that attaches the backing block to the male fitting. This means that the fluid cannot flow until the Valve is also attached, according to one embodiment. In this example, the new attachment device (male part and female part) dramatically reduces the space requirements (e.g., 1, 2, 3, 4, 5, 6, 7, 8, 9, and 10 inches) as it is smaller and does not require wire inserts for placement/removal of Valves, allowing the CFiVe backing blocks to be placed closer to one another. This allows for backing blocks to be placed closer together for applications where multiple valves are utilized and space is constrained or for applications where the location of the valve is close to the cooling or heating element or point of dispense is critical.

Figure 8:
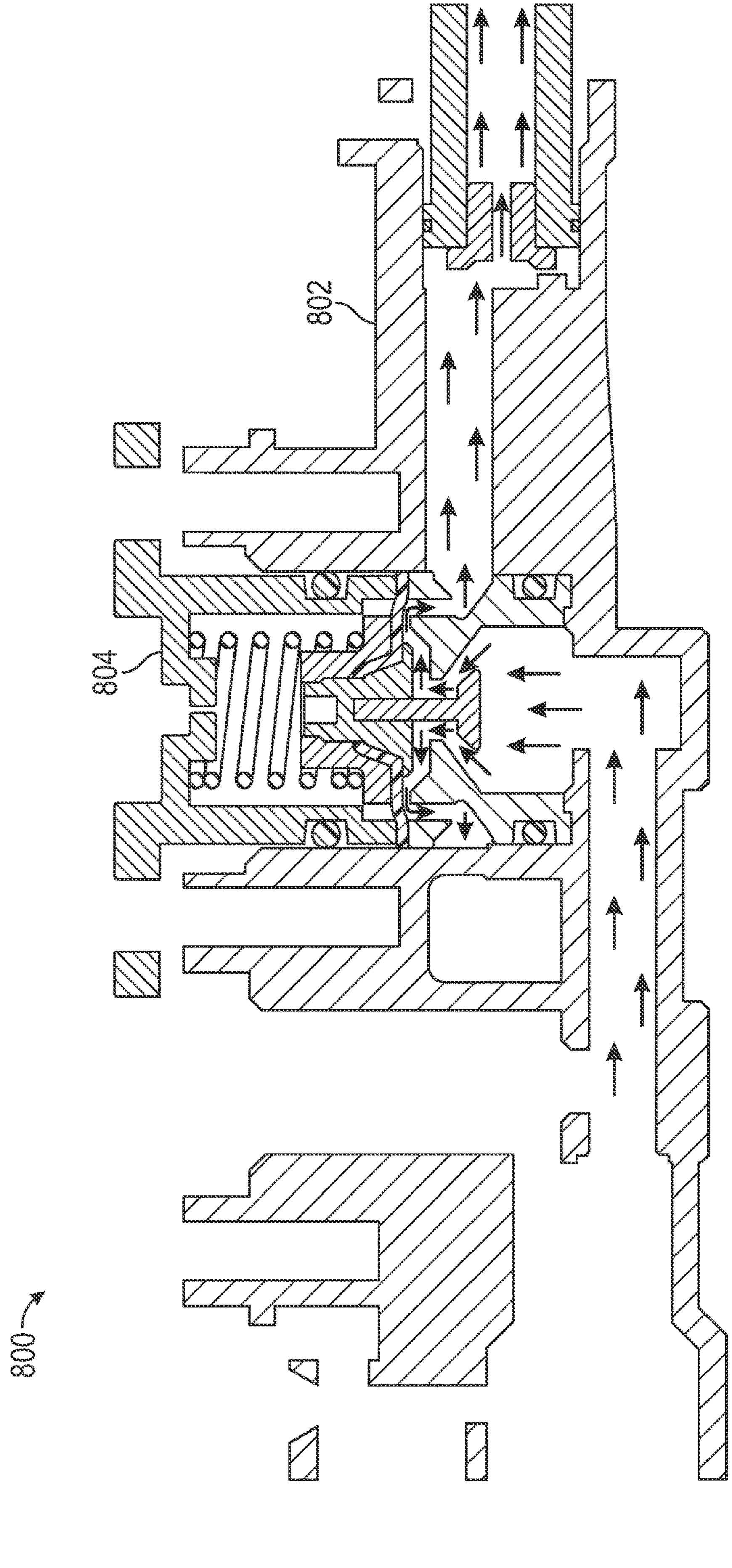
FIG. 8 is an illustration of a dispensing device, according to one embodiment.

In FIG. 8, a dispensing device 802 is shown with a control orifice inside the bar gun which may be set to factory settings. The Cartridge CF Valve 804 can be assembled with the orifice inside the CF Valve a factory set flow rate to eliminate tampering with the orifice and therefore the flow rates. The cartridge CF Valve is symmetrical so that no indexing is required when assembling. The spring cap is sized and molded to be slightly loose on the housing so that if the stack tolerances are all on the plus side the pressure on the diaphragm will still be sufficient to cause a seal. In another example, the cartridge CF Valve may have a fixed orifice. In another example, the orifice may be in the outlet side which also the orifice to be replaceable. It should be noted that the disclosure relating to the bar gun may be utilized with any other equipment in this disclosure. Further, all disclosures relating to one element (e.g., the ball, the CF Valve, the Cartridge CF Valve, the backing block, the needle, etc.) may be utilized with any other disclosure relating to any other element (e.g., the ball, the CF Valve, the Cartridge CF Valve, the backing block, the needle, etc.). For example, the ball disclosure may be combined with the cartridge CF Valve disclosure. Further, one feature (and/or one or more features) of the ball disclosure may be combined with one feature (and/or one more features) of the cartridge CF Valve disclosure. For brevity, all of the other items disclosed in this disclosure will not be listed out but are inherently combinable in this disclosure.

In one example, a CF Valve may encounter with a line pressure of 100 PSI and an outlet pressure of 40 PSI when the outlet is open. Further, the CF Valve may encounter a line pressure of 100 PSI and an outlet pressure of 100 PSI because the pin is not closed. In addition, the CF Valve may encounter a line pressure of 100 PSI and an outlet pressure of 46 PSI because the pin is closed.

Figure 9:
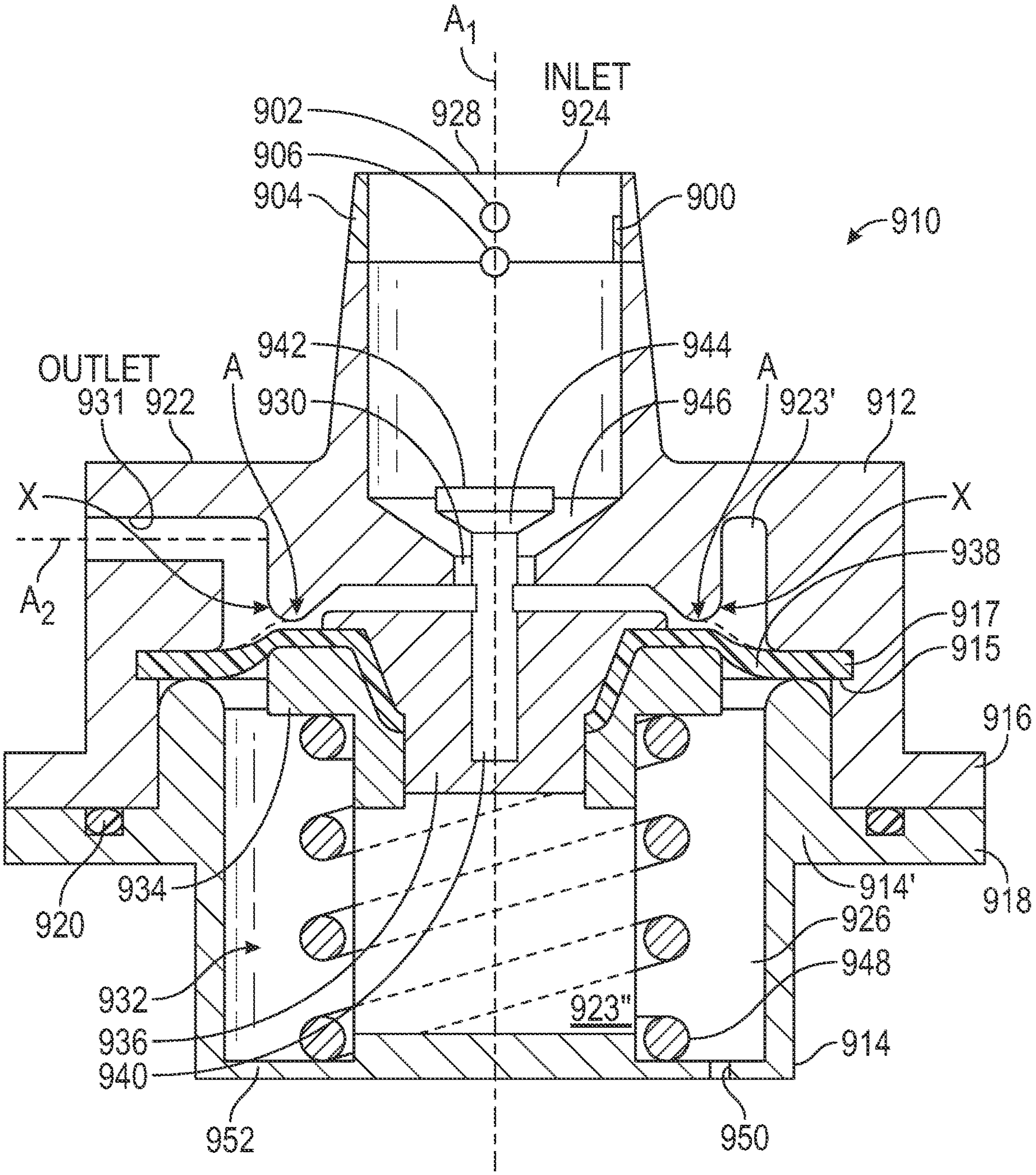
FIG. 9 is an illustration of a CF Valve, according to one embodiment.

In FIG. 9, a magnetically activated ball valve device 900 has been added to regulating valve 910 where the magnetically activated ball valve device 900 is located in a position relative to the inlet (e.g., incoming fluid). In this example, the magnetically activated ball valve device includes an opening, a ball, and a magnetic device. In other embodiments, the ball valve device 900 may be activated by the fluid flow, mechanical functionality (e.g., levers, etc.), magnetic functionality, and/or any combination of movement devices.

Figure 10:
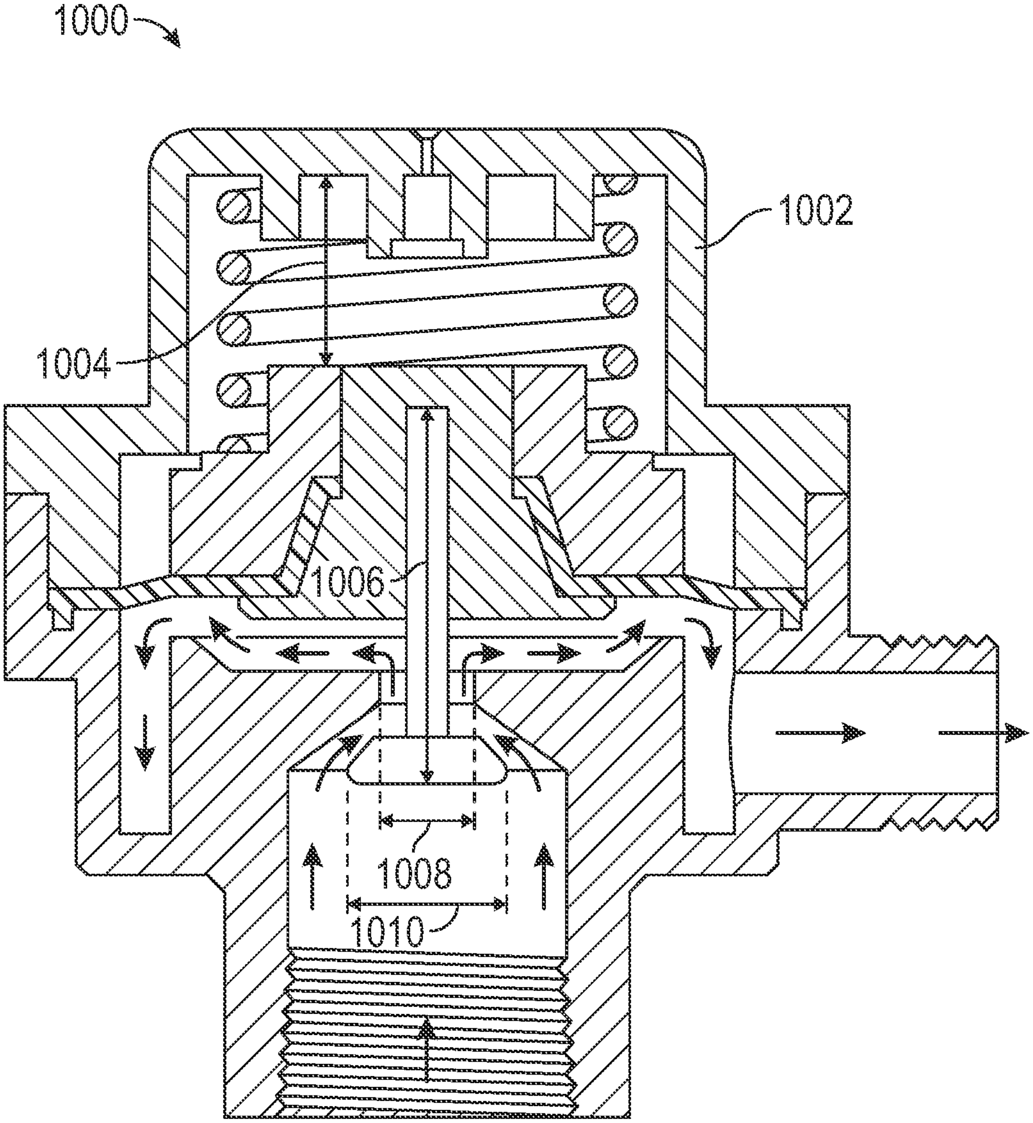
FIG. 10 is an illustration of a CF Valve, according to one embodiment.

In FIG. 10, an illustration of a CF Valve system is shown, according to one embodiment. FIG. 10 demonstrates the operations of the CFValve technology, which can precisely control flow rate and pressure. Therefore, accurate accounting may be completed to determine inventory drawl and/or utilization. In other words, based on the amount of time the CFValve is opened and/or operated, one or more calculations can be completed relating to syrup used (e.g., syrup 1 used x units, syrup 2 used y units, etc.), cups sold, etc. For example, based on the information that the CFvalve was open for 10 hours; 3 minutes; and 13 seconds during a first day, the system, device, and/or method may determine that 10,000 units of syrup 1 were used with 40,000 units of CO2 or water. This information can be combined with inventory data to provide a just in time delivery cycle. Further, similar information for a plurality of syrups can determine sales growth relative to each other, which can indicate one or more opportunities and/or issues. In another example, based on information from the CFValve usage, syrup 1 used 300 units whereas syrup 2 used only 80 units. Since syrup 2 performance relative to syrup 1 is outside a historical trend line, one or more actions (e.g., maintenance call, syrup container inspection, on-site marketing visit, etc.) may be taken. A CFValve 1000 may include a housing 1002, a spring force 1004, a throttle pin 1006, an inlet orifice 1008, and a throttle pin head 1010.

In these various examples, various pressures (e.g., 30 PSI to 70 PSI) are utilized which results in consistent average flow rates with relatively little movement from the targeted value. Therefore, even with varying pressures the CF Valve delivers consistent flow rate and target values. In various test results where a first product, a second product, and an Nth product were utilized with various results. In these examples, the target pour was achieved with a maximum plus of 2 percent and a maximum minus of 0.5 percent.

In one example, a CFValve dispensing system may including one or more processors, one or more liquid dispensing areas and an ice dispensing area. The CFValve dispensing system may communicate with the Internet and/or one or more remote devices via one or more connects utilizing one or more processors in CFValve dispensing system. In various examples, information relating to temperatures, pressures, mixtures, flow rates, cleanings, ice amounts, time of day usage, inventories, orders of inventory, maintenance needed, maintenance completed, pricing information, promotional information, promotional effects, and/or any other data in this disclosure may be communicated to and/or from CFValve dispensing system to and/or from the Internet (and/or any remote devices). In one example, the system, device, and/or method may transmit data, which shows a drop off of syrup unit sales right after a cleaning cycle which recovers the next day. This may be based on the flush out function being improperly completed. In other words, there is left over cleaning fluid in the lines which provides a bad taste until it washes out. In another example, when fountain drinks go on sale by 10 percent the amount sold increases by 5 percent—this information is determined utilizing data from the CFValve. In a specific example, when fountain drinks go on sale by 10 percent the amount sold of syrup 1 goes up by 15 percent whereas sales of syrup 2 stay flat. In another example, when fountain drinks go on sale by 20 percent sales go up by 25 percent.

With the fixed flow that is created by the CFValve—in any form, CFIVE, Discrete, CFV Cartridge, and/or CFValve 1×, 2×-3. The dispensing system may utilize simple data gathering to gain very important information.

For example, with a discrete CFValve running at a fixed flow the "on-time" of the solenoid can be captured and reported. With that ON time you can automatically calculate drinks dispensed (to compare to point of sales data), flavors preferred, inventory used (automatic inventory control and reordering), and even CO2 utilized for reordering CO2. Other useful customer behavior can be gathered—size per drink dispensed, number of actuations to fill a single cup, etc.

If this is combined with a touch screen or display screen (on top of machine or on each valve) it can also add custom graphics and/or advertisements to promote customer behaviors. There can be an automatic "sold out" notification when inventory is out—it can suggest an alternate drink when syrup is low or out.

The owner of the store (c-store, restaurant, fast food) or the beverage supplier can gather information on trends immediately—drinks that sell at certain times of days or days of the week, movement in preference for types of beverages dispensed, and this information can be agglomerated by market or nationwide to spot and take advantage of trends This drink dispensing device data may be combined with other data on food, gas, liquor, cigarette, and/or lottery sales to determine customer behavior for better marketing, product placement, etc.

Figure 11:
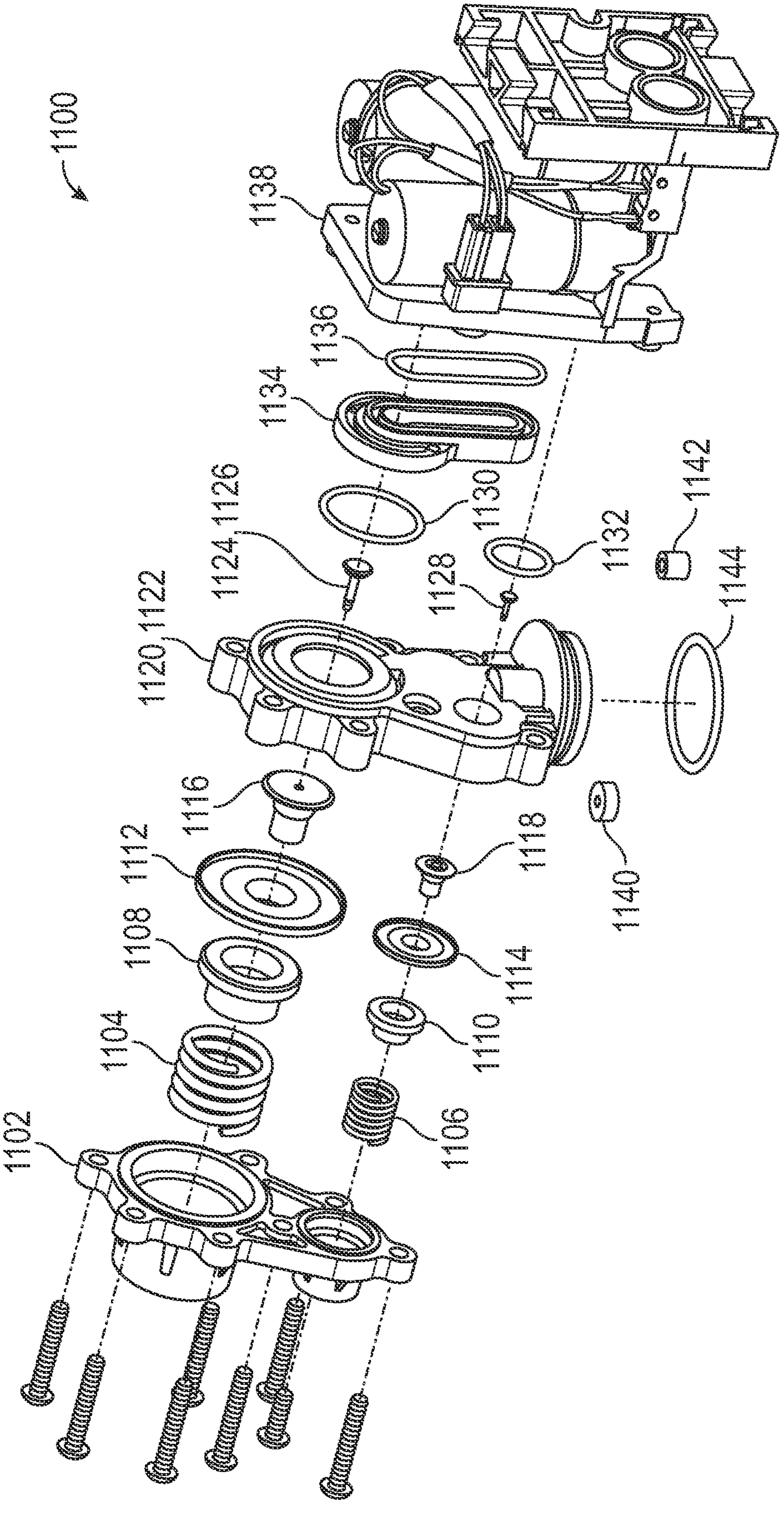
FIG. 11 is an illustration of a CF Valve, according to one embodiment.

In FIG. 11, an illustration of a CF Valve 1100 is shown, according to one embodiment. In one example, the CF Valve 1100 may include a spring cap 1102, a first spring 1104, a second spring 1106, a first retainer bottom 1108, a second retainer bottom 1110, a first diaphragm 1112, a second diaphragm 1114, a first retainer top 1116, a second retainer top 1118, a first CFValve body 1120, a second CFValve body 1122, a first throttle pin 1124, a second throttle pin 1126, a third throttle pin 1128, a first o-ring 1130, a second o-ring 1132, a seal insert 1134, an o-ring seal insert 1136, one or more solenoids 1138, a syrup orifice 1142, a water orifice 1144, and an o-ring diffuser 1144. In various examples, the first spring 1104 is 1.75×, the second spring 1106 is 1.0×, the first retainer bottom 1108 is 1.75×, the second retainer bottom 1110 is 1.0×, the first diaphragm 1112 is 1.75×, the second diaphragm 1114 is 1.0×, the first retainer top 1116 is 1.75×, the second retainer top 1118 is 1.0×, the first CFValve body 1120 is 1.75×, the second CFValve body 1122 is 1.0×, the first throttle pin 1124 is 1.75×, and the second throttle pin 1126 is 1.0×.

In FIGS. 12A-C, illustrations of a lift solenoid are shown, according to one embodiment. In one example, a CF Isolation Valve 1200 may include a housing 1202, a solenoid 1204, a plunger 1206, and an exiting flow rate 1208. FIG. 12A shows the CF Isolation Valve 1200 in a closed position because the plunger 1206 blocks the flow. In FIG. 12B, the plunger is lifted by 0.010" 1212 which creates a second flow rate 1214. Further, in FIG. 12C, the plunger is lifted by 0.020" 1222 which creates a third flow rate 1224 where the third flow rate 1224 is greater than the second flow rate 1214 because the first lift (e.g., 0.010") is smaller than the second lift (e.g., 0.020").

The solenoid pull piece or seals on the opening (volcano) when it is in a shut position, it lifts off that opening to allow for flow through. If the solenoid lift is modulated so that the pull piece lifts higher or lower depending on the desired flow rate it can be used to modulate flow when coupled with a CFValve upstream With the constant pressure upstream from the CFValve, the Solenoid lift can be used to increase or decrease flow rate. This can be done manually (tightening or loosening the spring that holds the pull piece in place) or electronically by increasing or decreasing the power to the solenoid causing the pull piece to lift higher or lower depending on the electrical signal.

For example if the opening/volcano is 0.100 inches in diameter, then the solenoid seal lifts only 0.010 inches off the seal it will generate a flow rate of A and if it lifts 0.020 inches off the seal the flow rate will increase as the total flow that passes through the opening and the solenoid plunger will increase as more space is allowed.

The shape of the solenoid plunger or plunger seal and the shape of the opening can be optimized to allow for fine tune changing of the flow rate by adding a funnel to the opening and/or a pointed shape to the solenoid plunger so that as it lifts it opens only a small amount more (vs. if it were a flat surface raising off a flat opening).

In another example, the solenoid can be pulsed on and off to create a specific flow rate. For example, pulsing the solenoid with a duty cycle of 1% to 99% can create various flow rates. For clarity a duty cycle of 100% means the solenoid is open the entire time period. Whereas, a duty cycle of 50% means the solenoid is open for 50 percent of the time period. This may be accomplished by opening the solenoid for 50 percent of the time and then closing the solenoid. In another example, this may be accomplished by opening the solenoid for 1 percent of the time and repeating this 50 times during the time period. In another example, this may be accomplished by opening the solenoid for 10 percent of the time and repeating this 5 times during the time period. For example, utilizing a duty cycle of 20% for a first element and a duty cycle of 66% for a second element will create a first drink configuration. In one example, water may run at a duty cycle of 100% while a cola runs at a duty cycle of 66% while a rum may run at a duty cycle of 100 percent and a lime runs at a duty cycle of 20 percent to create a drink dispensed at 1.67 oz/sec of water; 0.5 oz/sec of cola; 1.14 oz/sec of rum; and 0.3 oz/sec of lime.

Figure 13:
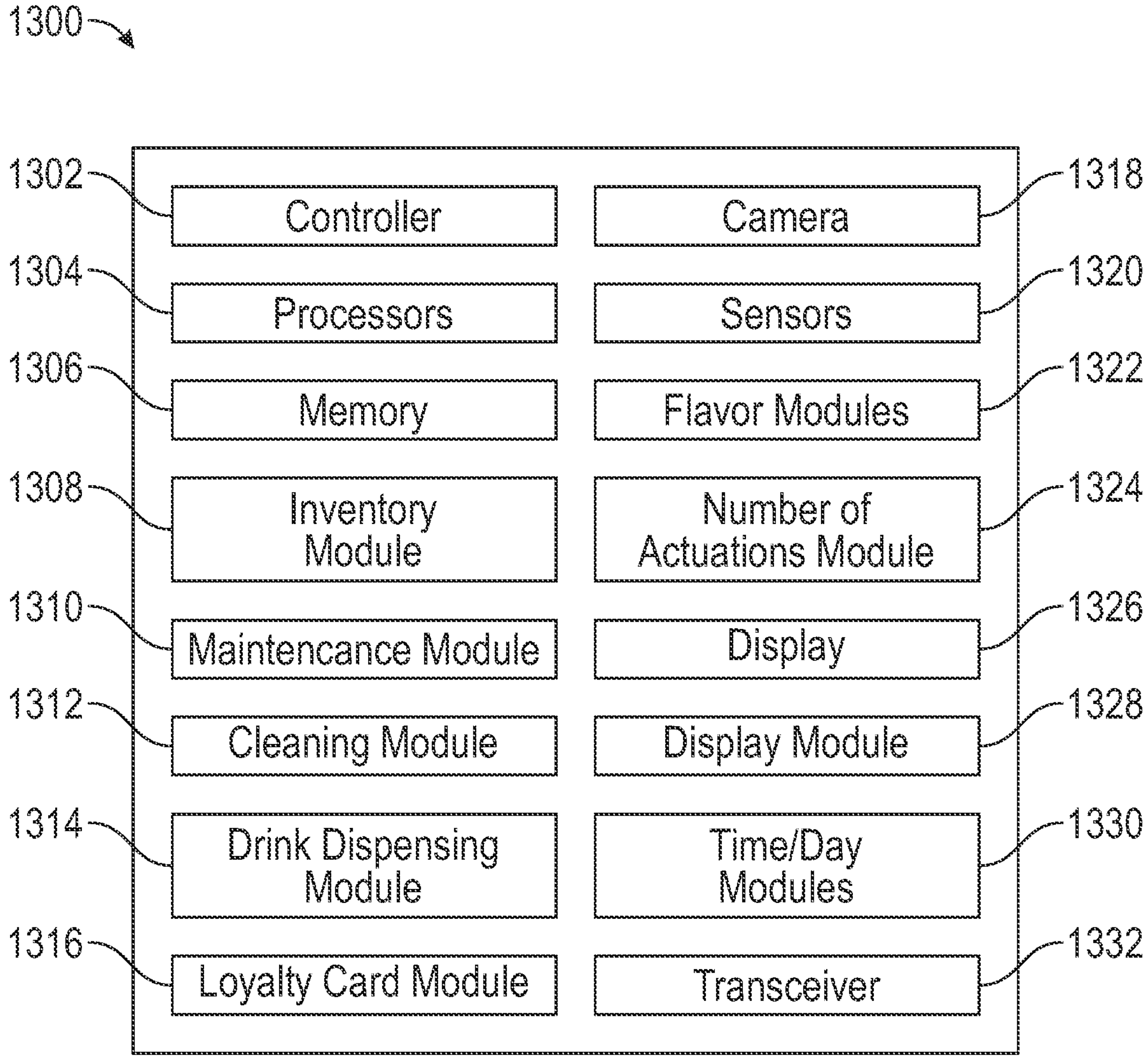
FIG. 13 is a block diagram of a system, according to one embodiment.

In FIG. 13, a block diagram is shown, according to one embodiment. A device 1300 may include a controller 1302, one or more processors 1304, one or more memories 1306, one or more inventory modules 1308, one or more maintenance modules 1310, one or more cleaning modules 1312, one or more drink dispensing modules 1314, one or more loyalty card modules 1316, one or more cameras 1318, one or more sensors 1320, one or more flavor modules 1322, one or more number of actuations modules 1324, one or more displays 1326, one or more display modules 1328, one or more time/day modules 1330, and/or one or more transceivers 1332.

In another example, syrup control and/or management can be enhanced because dumping and/or walk away can be tracked. For example, when a person buys a fountain drink that person may take a slip and if the taste is not correct that person may dump the contents of the container and refill with another flavor. This might indicate that the syrup ratio is out of range and/or another quality control issue. In addition, the person may just walk away and not purchase anything which could be an indication that the syrup ratio is out of range and/or another quality control issue.

In another example, the discrete valve may have a dual head. In one example, the backing block, the CFValve, and the solenoid all have their own outside skin so there is no need to add another. Just use the skin of the CFValve to attach to both. The inlet side of the CFValve can attach to the backing block and the outlet side of the CFValve to the solenoid. In another example, after exiting the metering function at 90 degrees, the flow is directed around the body and out through the center of the outlet housing.

In one example, a dispensing device includes a valve configured to interact with an inlet stream, the inlet stream having a first pressure, the valve having an outlet area with an outlet stream, the outlet stream having a second pressure, and a solenoid which interacts with the outlet stream. In addition, the dispensing device may have: at least one of the inlet stream and the outlet stream being a carbonated water; the first pressure is greater than the second pressure; a size of the solenoid is reduced based on a reduction in pressure from the first pressure to the second pressure; a size of the solenoid is reduced based on the valve; the inlet stream is a utility line; the orifice is fixed; the orifice is adjustable; the orifices are both fixed and adjustable; and the valve is a CF Valve. The CF Valve is a regulating valve for maintaining a substantially constant flow of fluid from a variable pressure fluid supply to a fluid outlet, the CFValve may including one or more of: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending there through from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another example, the dispensing device may further include: a dispensing unit including one or more flavor units and one or more water units where each of the one or more flavor units include a transportation unit, the transportation unit including a barrier element with one or more openings; a blockage device configured to close the one or more openings to prevent a flow from at least one of the one or more flavor units; and/or a movement device configured to move the blockage device to a first position relative to the one or more openings which allows for a passage of one or more fluid elements and one gaseous elements through the one or more openings in the blockage device.

The dispensing device may further include a carbonated unit. In another example, the movement device is a magnet. In another example, the movement device is an electromagnet. In another example, the dispensing device may have at least one of the one or more flavor units may be selectable. In addition, the at least one of the one or more flavor units may be automatically selectable.

In one embodiment, the cartridge includes: a body with a first groove and a second groove, the body including a body inlet area and a body outlet area; an O-ring coupled to body via the first groove; a throttle pin coupled to the inlet area; a spring cap with a groove area, a spring cap inlet area, and a spring cap outlet area; a spring cap O-ring coupled to the spring cap via the groove area; a spring coupled to a bottom retainer; a diaphragm coupled to the bottom retainer; and a top retainer coupled to the diaphragm.

In addition, the cartridge may be configured to be inserted into a device. Further, the cartridge may be configured to be inserted into an existing device where the existing device has one or more inlet ports and outlet ports in any locations on the existing device. In addition, a cartridge inlet area and a cartridge outlet area may be in series with each other. Further, a cartridge inlet area and a cartridge outlet area may be at a 90 degree angle to each other (and/or any other angle and/or any other angle disclosed and/or shown in this document). In addition, the body may include a 360 degree outlet passage. Further, the spring cap may be configured to create a seal by compressing the diaphragm to the body. Further, the cartridge may include a CF Valve.

In another embodiment, a movement system includes: a cartridge with a cartridge inlet area and a cartridge outlet area; a housing with a housing inlet area and a housing outlet area; wherein the cartridge transfers at least one or more gases and one or more liquids from the housing inlet area to the housing outlet area independent of a relative position of the cartridge inlet area to the housing inlet area and the cartridge outlet area to the housing outlet area. In addition, the cartridge may include a body with a first groove, a body inlet area, and a body outlet area. In addition, the cartridge may include an O-ring coupled to body via the first groove. Further, the cartridge may include a throttle pin coupled to the inlet area. In addition, the cartridge may include a spring cap with a groove area, a spring cap inlet area, a spring cap outlet area, and a spring cap O-ring coupled to the spring cap via the groove area. Further, the cartridge may include a spring coupled to a bottom retainer. Further, the cartridge may include a diaphragm coupled to the bottom retainer. In addition, the cartridge may include a top retainer coupled to the diaphragm. In addition, the cartridge may include a CF Valve.

In another embodiment, a cartridge includes: a body with a first groove and a second groove, the body including a body inlet area and a body outlet area; an O-ring coupled to body via the first groove; a throttle pin including a pin and a pinhead coupled to the inlet area; a spring cap with a groove area, a spring cap inlet area, and a spring cap outlet area; a spring cap O-ring coupled to the spring cap via the groove area; a spring coupled to a bottom retainer; a diaphragm coupled to the bottom retainer; and a top retainer coupled to the diaphragm. In addition, the at least one of the pin and the pinhead may have a ratio of greater than 1 to the body. Further, the at least one of the pin and the pinhead may have a ratio of less than 1 to the body. In addition, the cartridge may be configured to be inserted into a device. Further, the cartridge may be configured to be inserted into an existing device where the existing device has one or more inlet ports and outlet ports in any locations on the existing device.

In one embodiment, a cleaning system for a drink dispensing device includes: a cleaner canister coupled to a water source; a cleaner CFValve coupled to the water source which provides a first water flow to the cleaner canister. The cleaner canister may provide a cleaner solution to one or more parts of the drink dispensing device.

In another example, the cleaning system may include a sanitizer canister coupled to the water source and a sanitizer CFValve coupled to the water source which provides a second water flow to the sanitizer canister. The sanitizer canister may provide a sanitizer solution to one or more parts of the drink dispensing device. In another example, the cleaning system may include a water flush device coupled to the water source and a water flush CFValve coupled to the water source which provides a third water flow to the one or more parts of the drink dispensing device.

In another example, the cleaning system may include an inlet dry breaking fitting and an outlet dry breaking fitting on the sanitizer canister. In another example, the cleaning system may include an inlet dry breaking fitting and an outlet dry breaking fitting on the cleaner canister. In another example, the cleaning system may include a total dissolved solids device which measures an inlet total dissolved solids and an outlet total dissolved solids. In another example, the cleaning system may include a sanitizer canister coupled to the water source and a sanitizer CFValve coupled to the water source which provides a second water flow to the sanitizer canister. The sanitizer canister may provide a sanitizer solution to one or more parts of the drink dispensing device. A water flush device coupled to the water source and a water flush CFValve coupled to the water source which provides a third water flow to the one or more parts of the drink dispensing device. A total dissolved solids device which measures an inlet total dissolved solids and an outlet total dissolved solids. In another example, the cleaning system may include a sanitizer canister coupled to the water source and a sanitizer CFValve coupled to the water source which provides a second water flow to the sanitizer canister. The sanitizer canister may provide a sanitizer solution to one or more parts of the drink dispensing device; a water flush device coupled to the water source and a water flush CFValve coupled to the water source which provides a third water flow to the one or more parts of the drink dispensing device. A total dissolved solids device which measures an inlet total dissolved solids and an outlet total dissolved solids. An inlet dry breaking fitting and an outlet dry breaking fitting on the sanitizer canister. An inlet dry breaking fitting and an outlet dry breaking fitting on the cleaner canister. A controller that controls one or more ratios based on the inlet total dissolved solids and the outlet total dissolved solids. In another example, one or more of the cleaner CFValve, the sanitizer CFValve, and the water flush CFValve may maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice. In another example, one or more of the cleaner CFValve, the sanitizer CFValve, and the water flush CFValve is configured to maintain a relative constant flow of fluid from a variable pressure fluid supply to a fluid outlet, the CF Valve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

In one embodiment, a control device may include one or more processors to determine drink dispensing data, a housing with at least one inlet and at least one outlet, the housing containing a control unit and a solenoid, where the control unit maintains a relative constant flow of fluid from a variable pressure fluid supply to a fluid outlet, the control unit including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice.

In another example, the one or more processors transmit the drink dispensing data to a remote device. In another example, the remote device transmits commands to the one or more processors based on the transmitted drink dispensing data. Further, the remote device initiates one or more actions based on the transmitted drink dispensing data. In addition, the one or more actions is at least a product order. In another example, the control device may include an orifice in the housing. In addition, the orifice may be located in the at least one outlet. Further, the orifice may be a fixed orifice or an adjustable orifice. In another example, at least one outlet includes a first outlet and a second outlet. In addition, the solenoid may be located at a dividing section connecting the first outlet and the second outlet. In addition, the solenoid may be located at a combining section connecting the first outlet and the second outlet. In another example, the solenoid may be located downstream of the control unit. In addition, the solenoid may be located upstream of the control unit.

In another embodiment, a drink dispensing device may include one or more processors, a drink dispensing item located above a drink container positioning area, and/or a first sensor configured to determine when a drink container is located in the drink container positioning area where the one or more processors may initiate a drink container filling operation based on a first signal from the first sensor that the drink container is located in the drink container positioning area.

In another example, the one or more processors may discontinue the drink container filling operation based on a second signal from the first sensor that indicates a stoppage of the drink container filling operation. In addition, the first sensor may be positioned at an angle of 20 degrees to the drink positioning area. Further, the drink dispensing device may include including a second sensor positioned at a borderline area of the drink container positioning area. In addition, the drink dispensing device may include a third sensor positioned at a horizontal line of the drink container positioning area. In various examples, the first sensor may be positioned at an angle in the range of 15 degrees to 25 degrees to the drink positioning area.

In light of the foregoing, it will now be appreciated by those skilled in the art that the present disclosure embodies a number of significant advantages, the foremost being the automatic pressure responsive control of fluid flow between a variable pressure source and an applicator from which the fluid is to be applied in a substantially uniform manner. The regulating valve is designed for low cost mass production, having a minimum number of component parts, the majority of which can be precision molded and automatically assembled.

In one example, a regulating valve for maintaining a substantially constant flow of fluid from a variable pressure fluid supply to a fluid outlet includes: a housing having axially aligned inlet and outlet ports adapted to be connected respectively to the fluid supply and the fluid outlet, and a diaphragm chamber interposed between the inlet and outlet ports, the inlet port being separated from the diaphragm chamber by a barrier wall, the barrier wall having a first passageway extending therethrough from an inner side facing the diaphragm chamber to an outer side facing the inlet port; a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; a resilient disc-shaped diaphragm closing the open mouth of the cup, the diaphragm being axially supported exclusively by the circular rim and having a peripheral flange overlapping the cylindrical side wall; a piston assembly secured to the center of the diaphragm, the piston assembly having a cap on one side of the diaphragm facing the inner side of the barrier wall, and a base suspended from the opposite side of the diaphragm and projecting into the interior of the cup; a stem projecting from the cap through the first passageway in the barrier wall to terminate in a valve head, the valve head and the outer side of the barrier wall being configured to define a control orifice connecting the inlet port to the diaphragm chamber via the first passageway; and a spring in the cup coacting with the base of the piston assembly for resiliently urging the diaphragm into a closed position against the inner side of the barrier wall to thereby prevent fluid flow from the inlet port via the first passageway into the diaphragm chamber; and the spring being responsive to fluid pressure above a predetermined level applied to the diaphragm via the inlet port and the first passageway by resiliently accommodating movement of the diaphragm away from the inner side of the barrier wall, with the valve head on the stem being correspondingly moved to adjust the size of the control orifice, thereby maintaining a substantially constant flow of fluid from the inlet port through the first and second passageways to the outlet port for delivery to the fluid outlet.

In another example, a regulating valve for controlling the flow of fluid from a variable pressure fluid supply to a fluid outlet includes: a housing having axially aligned inlet and outlet ports adapted to be connected respectively to the fluid supply and the fluid outlet, and a diaphragm chamber interposed between the inlet and outlet ports, the inlet port being separated from the diaphragm chamber by a barrier wall, the barrier wall having a first passageway extending therethrough from an inner side facing the diaphragm chamber to an outer side facing the inlet port; a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; a resilient disc-shaped diaphragm closing the open mouth of the cup, the diaphragm being supported exclusively by the circular rim and having a peripheral flange overlapping the cylindrical side wall; a piston assembly secured to the center of the diaphragm, the piston assembly having a base projecting into the interior of the cup; a spring in the cup coacting with the base of the piston assembly for resiliently urging the diaphragm into a closed position against the inner side of the barrier wall to thereby prevent fluid flow from the inlet port via the first passageway into the diaphragm chamber; and the spring being responsive to fluid pressure above a predetermined level applied to the diaphragm via the inlet port and the first passageway by resiliently accommodating movement of the diaphragm away from the inner side of the barrier wall, thereby accommodating a flow of fluid from the inlet port through the first and second passageways to the outlet port for delivery to the fluid outlet.

In another example, the control orifice is defined by frusto conical surfaces on the valve head and the outer side of the barrier wall. In another example, the cross sectional area of the control orifice is less than the cross sectional area of the first passageway throughout the range of movement of the valve head in response to fluid pressure applied to the diaphragm. In another example, the regulating valve further includes a vent passageway leading from the interior of the cup to the exterior of the housing. In another example, the housing is exteriorly provided with a deflecting surface adjacent to the outlet of the vent passageway, the deflecting surface being configured and arranged to direct fluid escaping from the interior of the cup in the general direction of fluid flowing through the valve, but angularly away from the valve axis. In another example, the base of the piston assembly is spaced from the bottom wall of the cup by an open gap, and wherein the spring means comprises a coiled spring bridging the gap and in contact at its opposite ends with the bottom wall and the base. In another example, the piston assembly is centered within the cup solely by the resilient support provided by the diaphragm. In another example, the housing is comprised of mating plastic inlet and outlet sections, the sections being formed by injection molding and being permanently assembled one to the other by sonic welding. In another example, the cap and base of the piston assembly are each injection molded of plastic and joined one to the other by sonic welding, with a central portion of the diaphragm held therebetween.

In one example, a dispensing device includes a valve configured to interact with an inlet stream, the inlet stream having a first pressure, the valve having an outlet area with an outlet stream, the outlet stream having a second pressure, and a solenoid which interacts with the outlet stream. In addition, the dispensing device may have: at least one of the inlet stream and the outlet stream being a carbonated water; the first pressure is greater than the second pressure; a size of the solenoid is reduced based on a reduction in pressure from the first pressure to the second pressure; a size of the solenoid is reduced based on the valve; the inlet stream is a utility line; the orifice is fixed; the orifice is adjustable; the orifices are both fixed and adjustable; and the valve is a CF Valve. The CF Valve is a regulating valve for maintaining a substantially constant flow of fluid from a variable pressure fluid supply to a fluid outlet, the CFValve may including one or more of: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another example, the dispensing device may further include: a dispensing unit including one or more flavor units and one or more water units where each of the one or more flavor units include a transportation unit, the transportation unit including a barrier element with one or more openings; a blockage device configured to close the one or more openings to prevent a flow from at least one of the one or more flavor units; and/or a movement device configured to move the blockage device to a first position relative to the one or more openings which allows for a passage of one or more fluid elements and one gaseous elements through the one or more openings in the blockage device.

The dispensing device may further include a carbonated unit. In another example, the movement device is a magnet. In another example, the movement device is an electromagnet. In another example, the dispensing device may have at least one of the one or more flavor units may be selectable. In addition, the at least one of the one or more flavor units may be automatically selectable.

In one embodiment, the cartridge includes: a body with a first groove and a second groove, the body including a body inlet area and a body outlet area; an o-ring coupled to body via the first groove; a throttle pin coupled to the inlet area; a spring cap with a groove area, a spring cap inlet area, and a spring cap outlet area; a spring cap o-ring coupled to the spring cap via the groove area; a spring coupled to a bottom retainer; a diaphragm coupled to the bottom retainer; and a top retainer coupled to the diaphragm.

In addition, the cartridge may be configured to be inserted into a device. Further, the cartridge may be configured to be inserted into an existing device where the existing device has one or more inlet ports and outlet ports in any locations on the existing device. In addition, a cartridge inlet area and a cartridge outlet area may be in series with each other. Further, a cartridge inlet area and a cartridge outlet area may be at a 90 degree angle to each other (and/or any other angle and/or any other angle disclosed and/or shown in this document). In addition, the body may include a 360 degree outlet passage. Further, the spring cap may be configured to create a seal by compressing the diaphragm to the body. Further, the cartridge may include a CF Valve.

In another embodiment, a movement system includes: a cartridge with a cartridge inlet area and a cartridge outlet area; a housing with a housing inlet area and a housing outlet area; wherein the cartridge transfers at least one or more gases and one or more liquids from the housing inlet area to the housing outlet area independent of a relative position of the cartridge inlet area to the housing inlet area and the cartridge outlet area to the housing outlet area. In addition, the cartridge may include a body with a first groove, a body inlet area, and a body outlet area. In addition, the cartridge may include an o-ring coupled to body via the first groove. Further, the cartridge may include a throttle pin coupled to the inlet area. In addition, the cartridge may include a spring cap with a groove area, a spring cap inlet area, a spring cap outlet area, and a spring cap o-ring coupled to the spring cap via the groove area. Further, the cartridge may include a spring coupled to a bottom retainer. Further, the cartridge may include a diaphragm coupled to the bottom retainer. In addition, the cartridge may include a top retainer coupled to the diaphragm. In addition, the cartridge may include a CF Valve.

In another embodiment, a cartridge includes: a body with a first groove and a second groove, the body including a body inlet area and a body outlet area; an o-ring coupled to body via the first groove; a throttle pin including a pin and a pinhead coupled to the inlet area; a spring cap with a groove area, a spring cap inlet area, and a spring cap outlet area; a spring cap o-ring coupled to the spring cap via the groove area; a spring coupled to a bottom retainer; a diaphragm coupled to the bottom retainer; and a top retainer coupled to the diaphragm. In addition, the at least one of the pin and the pinhead may have a ratio of greater than 1 to the body. Further, the at least one of the pin and the pinhead may have a ratio of less than 1 to the body. In addition, the cartridge may be configured to be inserted into a device. Further, the cartridge may be configured to be inserted into an existing device where the existing device has one or more inlet ports and outlet ports in any locations on the existing device.

In one embodiment, a cartridge may include: a body with a first groove and a second groove, the body including a body inlet area and a body outlet area; an o-ring coupled to body via the first groove; a throttle pin coupled to a top retainer through the inlet area; a spring cap with a groove area; a spring cap o-ring coupled to the spring cap via the groove area; a spring coupled to a bottom retainer; a diaphragm coupled to the bottom retainer; and the top retainer coupled to the diaphragm.

In addition, the cartridge may be inserted into a manifold of a bar gun system. Further, the bar gun system may include one or more solenoids located inside a bar gun; the manifold; the bar gun system, and/or any other element disclosed in this disclosure. In addition, a cartridge inlet area and a cartridge outlet area may be in series with each other. Further, a cartridge inlet area and a cartridge outlet area may be at a 90 degree angle to each other. Further, the body may include a 360 degree outlet passage. In addition, the spring cap may create a seal by compressing the diaphragm to the body.

In another embodiment, a valve may include: an inlet mount coupled to a first assembly O-ring and a second assembly O-ring; a first throttle pin coupled to the inlet mount and a body; a second throttle pin coupled to the inlet mount and the body; a first diaphragm assembly coupled to the body and a first spring; a second diaphragm assembly coupled to the body and a second spring; a spring cup coupled to the first spring, the second spring, and the body; and the body coupled to the inlet mount.

In addition, the inlet mount may be coupled to the first assembly O-ring at a first inlet mount location and the second assembly O-ring may be coupled to the inlet mount at a second inlet mount location. Further, the first assembly O-ring may be a first size and the second assembly O-ring may be a second size. In addition, the first throttle pin may be coupled to the inlet mount at a first inlet mount throttle pin location and the first throttle pin may be coupled to the body at a first throttle pin body location and the second throttle pin may be coupled to the inlet mount at a second inlet mount throttle pin location and the second throttle pins may be coupled to the body at a second throttle pin body location. In addition, the first throttle pin may be a first size and the second throttle pin may be a second size. In addition, the first diaphragm assembly may be coupled to the body at a first diaphragm assembly body location and the second diaphragm assembly may be coupled to the body at a second diaphragm assembly body location. Further, the first diaphragm assembly may be a first size and the second diaphragm assembly may be a second size. Further, the first spring may be a first size and the second spring may be a second size.

In another embodiment, a bar gun device may include: a manifold; a first tube; a second tube; an Nth tube; a first CF Valve located at a first position inside the first tube; a second CF valve located at a second position inside the second tube; an Nth CF valve located at an Nth position inside of the Nth tube; and a bar gun.

In addition, the first location may be a different position than the second location or the third location. Further, the bar gun device may include a first solenoid before the first CF valve, a second solenoid before the second CF valve, and an Nth solenoid before the Nth CF valve. In addition, the bar gun device may include a communication device which communicates between the bar gun and at least one of the first solenoid, the second solenoid, and the Nth solenoid. In addition, the communication device may actuate one or more of the first solenoid, the second solenoid, and the Nth solenoid.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples. Any combination of any element in this disclosure with any other element in this disclosure is hereby disclosed.

While there has been illustrated and described what are presently considered to be example features, it will be understood by those skilled in the art that various other modifications may be made, and equivalents may be substituted, without departing from the disclosed subject matter.

Additionally, many modifications may be made to adapt a particular situation to the teachings of the disclosed subject matter without departing from the central concept described herein. Therefore, it is intended that the disclosed subject matter not be limited to the particular examples disclosed.

What is claimed is:

1. A valve assembly comprising:

a CF Valve;

a solenoid coupled to the CF Valve;

an inlet area coupled to the CF Valve;

an outlet area; and a flow path that has a path through the CF Valve and along a side of the solenoid to the outlet area;

wherein the CF Valve and the solenoid are located on a plane.

2. The valve assembly of claim 1, further comprising a plunger coupled to the inlet area and in communication with the CF Valve.

3. The valve assembly of claim 2, further comprising a plunger opening device located between the CF Valve and the plunger.

4. The valve assembly of claim 1, wherein the solenoid is configured to be pulsed to generate a flow rate.

5. The valve assembly of claim 1, wherein the solenoid is configured to be pulsed based on a duty cycle.

6. The valve assembly of claim 1, wherein the solenoid is configured to modify a flow rate based on an electrical power level delivered to the solenoid.

7. The valve assembly of claim 1, wherein the solenoid further comprises a solenoid adjustment device.

8. The valve assembly of claim 7, wherein the solenoid adjustment device is configured to change a height of the solenoid.

9. The valve assembly of claim 1, wherein the CF Valve includes a housing having axially aligned inlet and outlet ports adapted to be connected respectively to a variable fluid supply and the fluid outlet; a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; a resilient disc-shaped diaphragm closing the open mouth of the cup, the diaphragm being axially supported by the circular rim and having a peripheral flange overlapping the cylindrical side wall; a piston assembly secured to the center of the diaphragm, the piston assembly having a cap on one side of the diaphragm facing the inner side of the barrier wall, and a base suspended from the opposite side of the diaphragm and projecting into the interior of the cup; a stem projecting from the cap through the first passageway in the barrier wall to terminate in a valve head, the valve head and the outer side of the barrier wall being configured to define a control orifice connecting the inlet port to the diaphragm chamber via the first passageway; and a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

10. The valve assembly of claim 1, wherein the CF Valve is configured to maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice.

11. The valve assembly of claim 1, wherein the CF Valve is configured to maintain a relative constant flow of fluid from a variable pressure fluid supply to a fluid outlet, the CF Valve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

12. An assembly comprising:

a CF Valve coupled to a solenoid and an inlet area on a first plane;

an outlet area located on a second plane; and a flow path which passes through the CF Valve to the outlet area on at least a portion of the first plane;

wherein the flow path is next to the solenoid.

13. The assembly of claim 12, wherein the inlet area further includes a plunger in communication with the CF Valve.

14. The assembly of claim 13, further comprising a plunger opening device located between the CF Valve and the plunger.

15. The assembly of claim 12, further comprising a backing block.

16. The assembly of claim 12, further comprising a CF Valve outlet ring.

17. The assembly of claim 12, further comprising a spring cavity vent.

18. The assembly of claim 12, wherein the solenoid further comprises a solenoid adjustment device.

19. The assembly of claim 18, wherein the solenoid adjustment device is configured to change a height of the solenoid.

20. The assembly of claim 19, wherein changing the height of the solenoid changes a flow rate.

* * * * *